United States Patent
Otsuka et al.

(10) Patent No.: US 10,978,711 B2
(45) Date of Patent: Apr. 13, 2021

(54) POSITIVE ELECTRODE ACTIVE MATERIAL FOR NONAQUEOUS ELECTROLYTE SECONDARY BATTERY, METHOD FOR PRODUCING THE SAME, POSITIVE ELECTRODE MIXTURE PASTE FOR NONAQUEOUS ELECTROLYTE SECONDARY BATTERY, AND NONAQUEOUS ELECTROLYTE SECONDARY BATTERY

(71) Applicant: SUMITOMO METAL MINING CO., LTD., Tokyo (JP)

(72) Inventors: Yoshihiro Otsuka, Niihama (JP); Motoaki Saruwatari, Niihama (JP); Kazuomi Ryoshi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 112 days.

(21) Appl. No.: 16/328,015

(22) PCT Filed: Aug. 29, 2017

(86) PCT No.: PCT/JP2017/031032
§ 371 (c)(1),
(2) Date: Jun. 17, 2019

(87) PCT Pub. No.: WO2018/043515
PCT Pub. Date: Mar. 8, 2018

(65) Prior Publication Data
US 2019/0312279 A1    Oct. 10, 2019

(30) Foreign Application Priority Data

Aug. 29, 2016 (JP) .............................. JP2016-166496

(51) Int. Cl.
*H01M 4/00* (2006.01)
*H01M 4/62* (2006.01)
(Continued)

(52) U.S. Cl.
CPC ......... *H01M 4/628* (2013.01); *H01M 4/1391* (2013.01); *H01M 4/36* (2013.01);
(Continued)

(58) Field of Classification Search
CPC ............... H01M 4/1391; H01M 4/628; H01M 2004/021; H01M 4/525
See application file for complete search history.

(56) References Cited

U.S. PATENT DOCUMENTS 8,852,811 B2 † 10/2014 Koga
2011/0315918 A1  12/2011 Kawai et al.
(Continued)

FOREIGN PATENT DOCUMENTS

JP   2012-028313 A   2/2012
JP   2013-084395 A   5/2013
(Continued)

OTHER PUBLICATIONS

International Search Report dated Oct. 10, 2017, issued in counterpart Application No. PCT/JP2017/031032, with English translation (5 pages).
(Continued)

*Primary Examiner* — Cynthia H Kelly
*Assistant Examiner* — Monique M Wills
(74) *Attorney, Agent, or Firm* — Westerman, Hattori, Daniels & Adrian, LLP

(57) ABSTRACT

A positive electrode active material for a nonaqueous electrolyte secondary battery contains a first lithium-metal composite oxide represented by General Formula: $Li_{s1}Ni_{1-x1-y1-z1}Co_{x1}Mn_{y1}M_{z1}O_{2+\alpha}$ and containing a secondary
(Continued)

particle formed of a plurality of flocculated primary particles and either one or both of a first compound containing lithium and boron and a second compound containing lithium and tungsten. Either one or both of the following characteristics (1) and (2) are satisfied: (1) the first compound covers surfaces of the primary particles, and a boron content is at least 0.01% by mass and up to 0.5% by mass relative to the entire positive electrode active material; and (2) the second compound covers the surfaces of the primary particles, and a tungsten content is at least 0.01% by mass and up to 1.0% by mass relative to the entire positive electrode active material.

8 Claims, 26 Drawing Sheets

(51) Int. Cl.
*H01M 4/36* (2006.01)
*H01M 4/505* (2010.01)
*H01M 4/525* (2010.01)
*H01M 4/1391* (2010.01)
*H01M 4/02* (2006.01)

(52) U.S. Cl.
CPC ........... *H01M 4/362* (2013.01); *H01M 4/505* (2013.01); *H01M 4/525* (2013.01); *H01M 2004/021* (2013.01); *H01M 2004/028* (2013.01)

(56) References Cited

U.S. PATENT DOCUMENTS

| | | |
|---|---|---|
| 2013/0277604 A1 | 10/2013 | Shimokita et al. |
| 2013/0309580 A1 | 11/2013 | Tomura |
| 2014/0087270 A1 | 3/2014 | Yoshida |
| 2015/0171424 A1 † | 6/2015 | Kenta |
| 2016/0013476 A1 † | 1/2016 | Oh |
| 2017/0207455 A1 * | 7/2017 | Watanabe ............. C23C 16/403 |
| 2017/0317339 A1 | 11/2017 | Shimokita et al. |

FOREIGN PATENT DOCUMENTS

| | | | |
|---|---|---|---|
| JP | 2013-125732 | A | 6/2013 |
| JP | 2013-239434 | A | 11/2013 |
| JP | 2015-201432 | A | 11/2015 |
| JP | 2015-536558 | A | 12/2015 |
| JP | 2016127004 | A2 † | 7/2016 |
| WO | 2012/105048 | A1 | 8/2012 |
| WO | 2012/160698 | A1 | 11/2012 |

OTHER PUBLICATIONS

International Preliminary Report on Patentability (Form PCT/IB/373) issued in counterpart International Application No. PCT/JP2017/031032 dated Mar. 5, 2019, with Form PCT/ISA/237, with English translation (16 pages).

* cited by examiner
† cited by third party

POSITIVE ELECTRODE ACTIVE MATERIAL FOR NONAQUEOUS ELECTROLYTE SECONDARY BATTERY, METHOD FOR PRODUCING THE SAME, POSITIVE ELECTRODE MIXTURE PASTE FOR NONAQUEOUS ELECTROLYTE SECONDARY BATTERY, AND NONAQUEOUS ELECTROLYTE SECONDARY BATTERY

TECHNICAL FIELD

The present invention relates to a positive electrode active material for a nonaqueous electrolyte secondary battery, a method for producing the same, a positive electrode mixture paste for a nonaqueous electrolyte secondary battery, and a nonaqueous electrolyte secondary battery.

BACKGROUND ART

In recent years, with the proliferation of portable electronic equipment such as cellular phones and notebook personal computers, development of a nonaqueous electrolyte secondary battery with reduced size and weight having high energy density is intensely demanded. Development of a secondary battery excellent in output characteristics and charging/discharging cycle characteristics is intensely demanded as a battery for electric vehicles including hybrid cars.

A positive electrode active material for a nonaqueous electrolyte secondary battery is a secondary battery satisfying such a demand; a lithium-ion secondary battery is a representative secondary battery. This lithium-ion secondary battery includes a negative electrode, a positive electrode, and an electrolyte solution, in which for active materials of the negative electrode and the positive electrode, materials that can de-insert and insert lithium are used.

Among lithium-ion secondary batteries, the research and development of which are currently energetically being conducted, lithium-ion secondary batteries containing a layered or spinel type lithium-metal composite oxide as a positive electrode active material can obtain as high voltage as 4 V class and are thus being practically used as batteries having high energy density.

Examples of the positive electrode active material that have been so far mainly presented include a lithium-cobalt composite oxide ($LiCoO_2$), which is relatively easily synthesized; a lithium-metal composite oxide ($LiNiO_2$) and a lithium-nickel-cobalt-manganese composite oxide ($LiNiv_3Co_{1/3}Mn_{1/3}O_2$) containing nickel, which is lower in price than cobalt; and a lithium-manganese composite oxide ($LiMn_2O_4$) containing manganese.

To further improve charging/discharging cycle characteristics, containing lithium excessively than a stoichiometric composition relative to metal elements such as nickel, cobalt, and manganese is effective, for example.

By the way, a positive electrode of a nonaqueous electrolyte secondary battery is formed by mixing the positive electrode active material, a binder such as polyvinylidene fluoride (PVDF), and an organic solvent such as N-methyl-2-pyrrolidone (NMP) together to make a positive electrode mixture paste and applying the positive electrode mixture paste to a collector such as aluminum foil, for example.

When the positive electrode mixture paste is produced, lithium may be released from the positive electrode active material in the positive electrode mixture paste, react with water contained in the binder and the like, and form lithium hydroxide. The formed lithium hydroxide and the binder react with each other, and the positive electrode mixture paste may gelate. Gelation of the positive electrode mixture paste brings about bad operability and worsening of yield.

Given these circumstances, some attempts to inhibit gelation of the positive electrode mixture paste are made. Patent Literature 1 presents a positive electrode composition for a nonaqueous electrolyte solution secondary battery containing a positive electrode active material containing a lithium-transition metal composite oxide and additional particles of acidic oxide particles, for example. It is said that in this positive electrode composition, lithium hydroxide formed through a reaction with water contained in a binder preferentially reacts with the acidic oxide to inhibit a reaction between the formed lithium hydroxide and the binder and to inhibit gelation of a slurry for a positive electrode. It is also said that the acidic oxide plays a role as a conductive material within the positive electrode, reduces the resistance of the entire positive electrode, and contributes to improvement in the output characteristics of the battery.

Patent Literature 2 presents a method for producing a lithium-ion secondary battery including preparing a lithium-transition metal oxide containing LiOH outside its composition as a positive electrode active material;

grasping a molar amount P of LiOH contained per 1 g of the positive electrode active material; preparing tungsten oxide in an amount of at least 0.05 mol in terms of tungsten atom per 1 mol of LiOH relative to the molar amount P of LiOH; and kneading the positive electrode active material and tungsten oxide together with a conductive material and a binding agent with an organic solvent to prepare a positive electrode paste.

Patent Literature 3 presents a positive electrode composition for a nonaqueous electrolyte solution secondary battery containing a lithium-transition metal composite oxide essentially containing nickel and tungsten and a boron compound containing a boron element and an oxygen element. It is said in Patent Literature 3 that using the positive electrode composition containing the lithium-transition metal composite oxide and the specific boron compound can improve the output characteristics and cycle characteristics of the positive electrode composition containing the lithium-transition metal composite oxide and inhibit an increase in the viscosity of a positive electrode slurry.

CITATION LIST

Patent Literature

[Patent Literature 1] Japanese Unexamined Patent Application Publication No. 2012-028313
[Patent Literature 2] Japanese Unexamined Patent Application Publication No. 2013-084395
[Patent Literature 3] Japanese Unexamined Patent Application Publication No. 2013-239434

Technical Problem

It is said that all the presentations of Patent Literature 1 to Patent Literature 3 can inhibit gelation of the positive electrode mixture paste. However, according to study by the inventor of the present invention, gelation of the positive electrode mixture paste tends to be conspicuous when lithium in the positive electrode active material is excessive than a stoichiometric ratio and the ratio of nickel is high, and further improvement in inhibition of gelation is required in the positive electrode active material containing such a composition.

In the positive electrode composition presented in Patent Literature 1, the acid oxide particles remain, whereby the separator may be broken. Although it is considered that inhibition of gelation can be further improved when the addition amount of the acid oxide is increased, the increase in the addition amount may increase raw material costs, or a weight increase caused by the addition of the acid oxide may reduce battery capacity per unit mass.

In also the positive electrode paste presented in Patent Literature 2, the remaining of tungsten oxide may break the separator. Tungsten as a heavy element that does not contribute to charging/discharging is added, whereby a reduction in battery capacity per weight may increase.

Although it is said that with the positive electrode composition presented in Patent Literature 3, output characteristics and cycle characteristics are improved, and an increase in the viscosity of the positive electrode slurry is inhibited, further improvement in inhibition of gelation is required. Although Patent Literature 3 describes a method for producing a positive electrode composition obtained by mixing the lithium-transition metal composite oxide and the boron compound together and then performing firing, this method of production involves the problem that productivity reduces.

In view of the above problems, an object of the present invention is to provide a positive electrode active material having high output characteristics and charging/discharging capacity and with gelation inhibited and a positive electrode mixture paste and a nonaqueous electrolyte secondary battery containing the same. Another object of the present invention is to provide a simple method for producing the positive electrode active material.

Solution to Problem

A first aspect of the present invention provides a positive electrode active material for a nonaqueous electrolyte secondary battery containing a first lithium-metal composite oxide represented by General Formula (1): $Li_{s1}Ni_{1-x1-y1-z1}Co_{x1}Mn_{y1}M_{z1}O_{2+\alpha}$ (where $0 \leq x \leq 1 \leq 0.35$, $0 \leq y1 \leq 0.35$, $0 \leq z1 \leq 0.10$, $0.95 < s1 < 1.30$, and $0 \leq \alpha \leq 0.2$; and M is at least one element selected from V, Mg, Mo, Nb, Ti, W, and Al) and containing a secondary particle formed of a plurality of flocculated primary particles and either one or both of a first compound containing lithium and boron and a second compound containing lithium and tungsten, in which either one or both of the following characteristics (1) and (2) are satisfied, and a lithium amount eluted when the positive electrode active material is dispersed in water measured by neutralization titration is at least 0.01% by mass and less than 0.4% by mass relative to the entire positive electrode active material:

(1) the first compound covers surfaces of the primary particles, and a boron content is at least 0.01% by mass and up to 0.5% by mass relative to the entire positive electrode active material; and (2) the second compound covers the surfaces of the primary particles, and a tungsten content is at least 0.01% by mass and up to 1.0% by mass relative to the entire positive electrode active material.

The positive electrode active material for a nonaqueous electrolyte secondary battery preferably has an average particle diameter of at least 5 μm and up to 30 μm and [(d90−d10)/Average particle diameter] as an indicator indicating a spread of particle size distribution of at least 0.70.

A second aspect of the present invention provides a method for producing a positive electrode active material for a nonaqueous electrolyte secondary battery including mixing fired powder and either one or both of a third compound containing boron and a fourth compound containing tungsten together to obtain a positive electrode active material, in which the fired powder is a second lithium-metal composite oxide represented by General Formula (2): $Li_{s1}Ni_{1-x1-y1-z1}Co_{x1}Mn_{y1}M_{z1}O_{2+\alpha}$ (where $0 \leq x2 \leq 0.35$, $0 \leq y2 \leq 0.35$, $0 \leq z2 \leq 0.10$, $0.95 < s2 < 1.30$, and $0 \leq \alpha' \leq 0.2$; and M is at least one element selected from V, Mg, Mo, Nb, Ti, W, and Al) and contains a secondary particle formed of a plurality of flocculated particles, a lithium amount eluted when the fired powder is dispersed in water measured by neutralization titration is at least 0.05% by mass and up to 1.0% by mass relative to the entire fired powder, and the third compound and the fourth compound are solid compounds that do not contain lithium and are capable of reacting with lithium and are mixed such that either one or both of the following conditions (3) and (4) are satisfied:

(3) a boron content is at least 0.01% by mass and up to 0.5% by mass relative to the entire positive electrode active material; and (4) a tungsten content is at least 0.01% by mass and up to 1.0% by mass relative to the entire positive electrode active material.

The amount of either one or both of the third compound and the fourth compound to be mixed is preferably adjusted such that the amount of lithium eluted when the positive electrode active material is dispersed in water measured by neutralization titration is at least 0.01% by mass and less than 0.4% by mass relative to the entire positive electrode active material. The third compound preferably contains either one or more selected from boric acid ($H_3BO_3$), boron oxide ($B_2O_3$), ammonium tetraborate tetrahydrate (($NH_4)_2B_4O_7 \cdot 4H_2O$), and ammonium pentaborate octahydrate (($NH_4)_2O \cdot 5B_2O_3 \cdot 8H_2O$). The fourth compound preferably contains tungstic acid ($H_2WO_4$).

A third aspect of the present invention provides a positive electrode mixture paste for a nonaqueous electrolyte secondary battery containing the positive electrode active material for a nonaqueous electrolyte secondary battery.

A fourth aspect of the present invention provides a nonaqueous electrolyte secondary battery including a positive electrode containing the positive electrode active material for a nonaqueous electrolyte secondary battery, a negative electrode, and a nonaqueous electrolyte solution.

The positive electrode active material of the present invention can provide a positive electrode mixture paste with gelation inhibited and having high stability. A secondary battery containing the positive electrode active material of the present invention has high output characteristics and charging/discharging capacity. Furthermore, the method for producing a positive electrode active material of the present invention is easy and is suitable for production on an industrial scale, and its industrial value is extremely high.

DESCRIPTION OF EMBODIMENTS

The following describes a positive electrode active material for a nonaqueous electrolyte secondary battery, a method for producing the same, and a positive electrode mixture paste for a nonaqueous electrolyte secondary battery and a nonaqueous electrolyte secondary battery containing the positive electrode active material according to one embodiment of the present invention with reference to the accompanying drawings.

The present invention is not limited to the following description. To describe the embodiment, the drawings draw part or the whole thereof schematically and include parts represented with magnification changed as appropriate including parts drawn in an enlarged manner or an emphasized manner.

1. Positive Electrode Active Material

Figure 1:
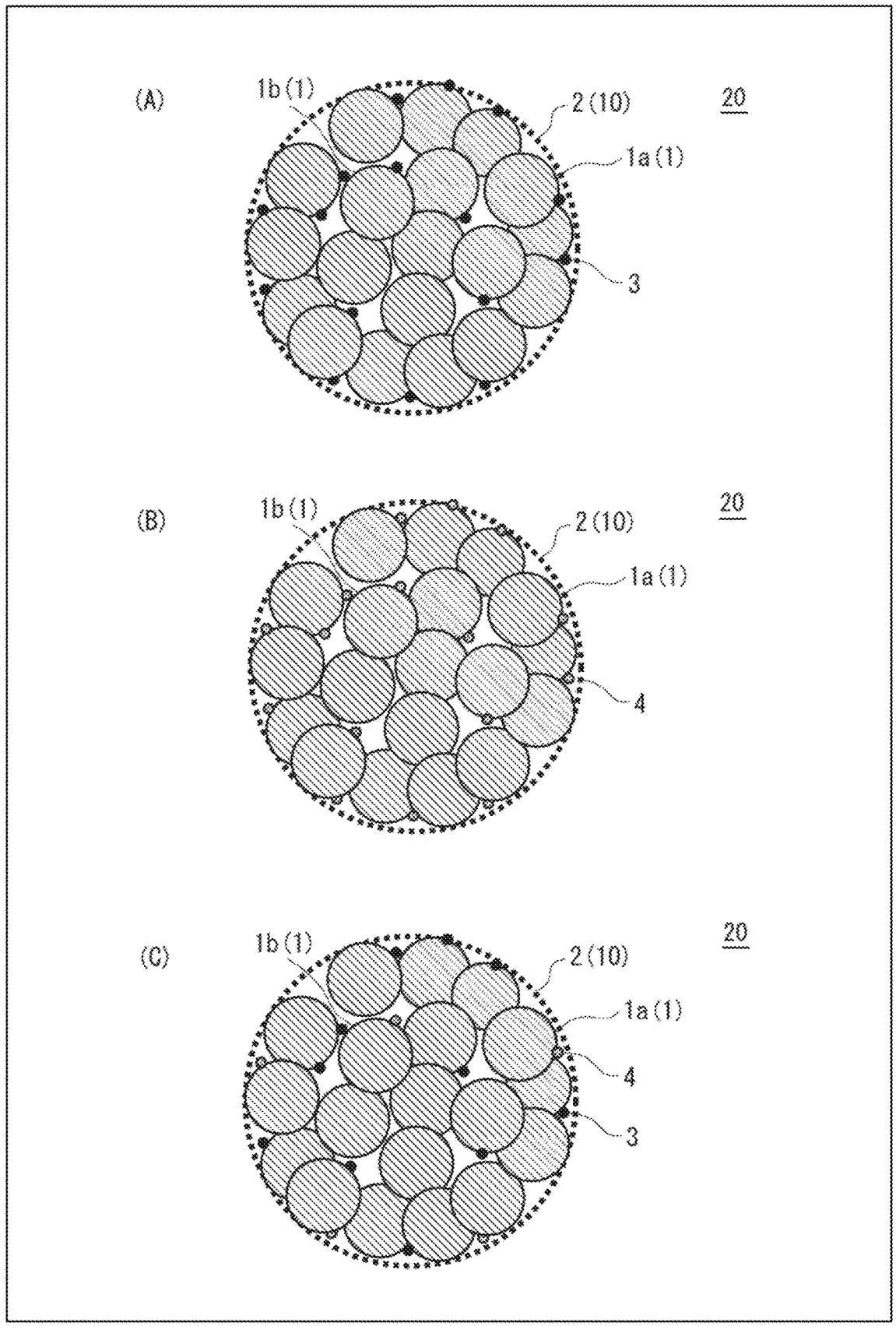
FIG. 1 include schematic diagrams of an exemplary positive electrode active material for a nonaqueous electrolyte secondary battery of an embodiment.

FIGS. 1(A) to 1(C) are schematic diagrams of an exemplary positive electrode active material for a nonaqueous electrolyte secondary battery of the present embodiment (hereinafter, also referred to as a "positive electrode active material").

Aa illustrated in FIGS. 1(A) to 1(C), this positive electrode active material 20 contains a first lithium-metal composite oxide 10 represented by General Formula (1): $Li_{s1}Ni_{1-x1-y1-z1}Co_{x1}Mn_{y1}M_{z1}O_{2+\alpha}$ (where $0 \le x1 \le 0.35$, $0 \le y1 \le 0.35$, $0 \le z1 \le 0.10$, $0.95 < s1 < 1.30$, and $0 \le \alpha \le 0.2$; and M is at least one element selected from V, Mg, Mo, Nb, Ti, W, and Al) and contains a secondary particle 2 formed of a plurality of flocculated primary particles 1 and either one or both of a first compound 3 containing lithium and boron (hereinafter, also referred to as an "LB compound") and a second compound 4 containing lithium and tungsten (hereinafter, also referred to as an "LW compound").

The positive electrode active material 20 satisfies either one or both of the following characteristics (1) and (2):

(1) the first compound 3 (the LB compound) covers surfaces of the primary particles 1, and a boron content is at least 0.01% by mass and up to 0.5% by mass relative to the entire positive electrode active material; and (2) the second compound 4 (the LW compound) covers the surfaces of the primary particles 1, and a tungsten content is at least 0.01% by mass and up to 1.0% by mass relative to the entire positive electrode active material.

In the positive electrode active material 20, the first compound 3 may be present on the surfaces of the primary particles 1 as illustrated in FIG. 1(A), for example, or the second compound 4 may be present on the surfaces of the primary particles 1 as illustrated in FIG. 1(B), for example. Alternatively, in the positive electrode active material 20, both the first compound 3 and the second compound 3 may be present on the surfaces of the primary particles 1 as illustrated in FIG. 1(C), for example.

The first compound 3 and the second compound 4 are high in lithium ion conductivity and have an effect of facilitating movement of lithium ions in a secondary battery. For this reason, when the surfaces of the primary particles 1 are covered with the first compound 3 or the second compound 4, lithium ion conductive paths can be formed on the interface with an electrolyte solution, the positive electrode resistance of the secondary battery is maintained or reduced, and output characteristics can be maintained or improved. In addition, voltage applied to a load side does not reduce, lithium insertion/de-insertion in a positive electrode is sufficiently performed, and the charging/discharging capacity of the secondary battery (hereinafter, also referred to as "battery capacity") can be maintained or improved.

The surfaces of the primary particles refer to parts capable of being in contact with the electrolyte solution when the secondary battery is produced. That is to say, the surfaces of the primary particles include not only a surface of a primary particle 1a exposed to an outer face (a surface) of the secondary particle 2 (that is, the surface of the secondary particle 2) but also a surface of a primary particle 1b present near the surface of and within the secondary particle 2, the surfaces of the primary particles 1 being capable of being in contact with the electrolyte solution when used for the secondary battery. Furthermore, the surfaces of the primary particles 1 include even grain boundaries between the primary particles 1, or a state the electrolyte solution can penetrate owing to imperfect bonding between the primary particles 1. In the positive electrode mixture paste, elution of lithium from the positive electrode active material 20 occurs on a contact surface with the electrolyte solution, and the first compound 3 and/or the second compound 4 are formed on the surfaces of the primary particles 1 capable of being in contact with the electrolyte solution, whereby elution of lithium can be inhibited.

The first lithium-metal composite oxide 10 as a matrix of the positive electrode active material 20 is a consequence of removing lithium immobilized by either one or both of a third compound containing boron and a fourth compound containing tungsten from fired powder (a second lithium-metal composite oxide represented by General Formula (2) described below) obtained by firing a nickel composite hydroxide and/or a nickel composite oxide obtained by performing oxidizing roasting on the nickel composite hydroxide and a lithium compound, for example.

Figure 2A:
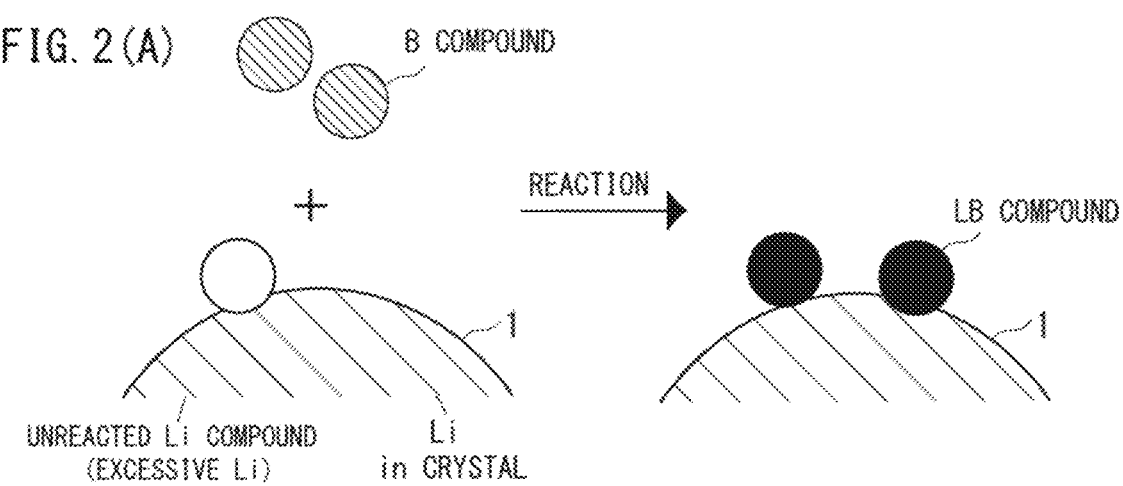
FIG. 2(A) is an illustrative diagram of a reaction forming a first compound (an LB compound)
Figure 2B:
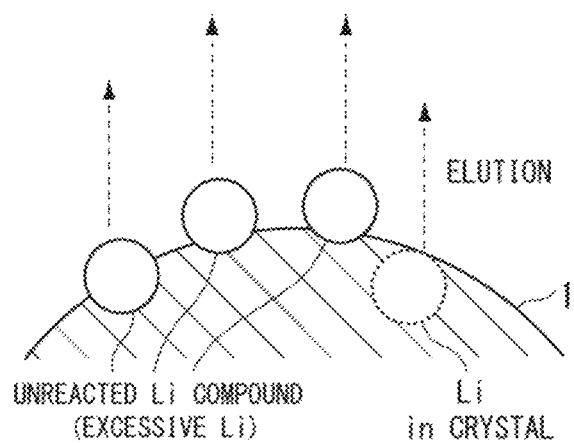
FIG. 2(B) is an illustrative diagram of exemplary eluted lithium of a conventional positive electrode active material.

On the surfaces of the primary particles 1 of the fired powder, unreacted lithium (hereinafter, also referred to as "excessive lithium") derived mainly from a raw material and lithium forming a crystal part are present as illustrated in FIG. 2(A) (left), for example. As illustrated in FIG. 2(B), when a positive electrode mixture paste (hereinafter, also referred to as a "paste") is produced, at least part of the unreacted lithium compound and the lithium forming the crystal part may be eluted from the surfaces of the primary particles 1 to the paste to react with a binder (a binding agent) and to cause gelation of the paste. The crystal part refers to a lithium-metal composite oxide after removing the excessive lithium from the first or second lithium-metal composite oxide.

In a conventional positive electrode active material, as in the fired powder described above, the excessive lithium and the lithium forming the crystal part may be eluted to cause gelation of the paste. On the other hand, as illustrated in FIG. 2(A) (left) and FIG. 2(C), the positive electrode active material 20 of the present embodiment causes at least part of the excessive lithium in the fired powder and the lithium forming the crystal part to react with the third compound that does not contain lithium and contains boron (hereinafter, also referred to as a "B compound"), for example, to be immobilized as the first compound (the LB compound) to the surfaces of the primary particles 1 of the first lithium-metal composite oxide 10 and can thereby control the amount of lithium eluted from the positive electrode active material 20 to a specific range. By controlling the eluted lithium amount to the specific range, gelation of the paste can be inhibited, although its detailed mechanism is unclear.

Although in FIG. 2(A) to FIG. 2(C) the first compound (the LB compound) is formed using the third compound (the B compound), the fourth compound that does not contain lithium and contains tungsten (hereinafter, also referred to as a "W compound") may be used in place of the third compound; in this case, the second compound (the LW compound) is formed on the surfaces of the primary particles 1. Among them, when the first compound 3 (the LB compound) is formed on the surfaces of the primary particles 1, gelation of the paste is further inhibited.

According to study by the inventors of the present invention, it has been revealed that in preparing the paste, for example, an acidic compound is added together with the positive electrode active material, whereby lithium eluted to the paste is neutralized, and gelation of the paste can be inhibited, but after lithium has been eluted to the paste, even when the eluted lithium is neutralized with the acidic compound, the effect of inhibiting gelation is not sufficient, which degrades battery characteristics.

(First Lithium-Metal Composite Oxide)

The first lithium-metal composite oxide 10 is represented by General Formula (1): $Li_{s1}Ni_{1-x1-y1-z1}Co_{x1}Mn_{y1}M_{z1}O_{2+\alpha}$ (where $0 \leq x1 \leq 0.35$, $0 \leq y1 \leq 0.35$, $0 \leq z1 \leq 0.10$, $0.95 < s1 < 1.30$, and $0 \leq \alpha \leq 0.2$; and M is at least one element selected from V, Mg, Mo, Nb, Ti, W, and Al). When the first lithium-metal composite oxide 10 has the above composition, high battery capacity and excellent output characteristics can be obtained when used for a positive electrode of a secondary battery. The contents of the respective elements can be measured by inductively coupled plasma (ICP) emission spectrometry.

In General Formula (1), the range of s1 indicating the content of lithium (Li) satisfies $0.95 < s1 < 1.3$. In the first lithium-metal composite oxide 10, when the ratio of Ni is high, the range of s may satisfy $0.95 < s1 < 1.05$. When s1 is within the above range, gelation of a paste containing the positive electrode active material 20 can be inhibited, and a secondary battery containing the positive electrode active material 20 can have high battery capacity and reduced positive electrode resistance.

In General Formula (1), x1 indicating the content of cobalt (Co) satisfies $0 \leq x1 \leq 0.35$ and, in view of further improving the battery capacity of the secondary battery containing the positive electrode active material 20, preferably $0 \leq x1 \leq 0.20$.

In General Formula (1), y1 indicating the content of manganese (Mn) satisfies $0 \leq y1 \leq 0.35$ and, in view of further improving the battery capacity of the secondary battery containing the positive electrode active material 20, preferably $0 \leq y1 < 0.10$.

In General Formula (1), M is an additional element, can be selected from a plurality of elements as described above in accordance with required characteristics, and can contain Al, for example. The symbol z1 indicating the content of M satisfies $0 \leq z1 \leq 0.10$ and, in view of further improving the battery capacity of the secondary battery containing the positive electrode active material 20, preferably $0 \leq z1 \leq 0.07$, and more preferably $0 \leq z1 \leq 0.05$.

In General Formula (1), (1-x1-y1-z1) indicating the content of nickel (Ni) satisfies $0.2 \leq (1-x1-y1-z1) \leq 1.0$ and, in view of further improving the battery capacity of the secondary battery containing the positive electrode active material 20, preferably $0.35 < (1-x1-y1-z1) \leq 1.0$, more preferably $0.45 (1-x1-y1-z1) \leq 1.0$, even more preferably $0.6 < (1-x1-y1-z1) \leq 1.0$, and still even more preferably $0.65 < (1-x1-y1-z1) \leq 1.0$.

In General Formula (1), when s1 indicating the content of lithium (Li) satisfies $1 < s1$, and the content of nickel (Ni) is increased, gelation of the paste tends to be likely to occur. However, the positive electrode active material 20 of the present embodiment forms the first compound 3 and/or the second compound 4 on the surfaces of the primary particles 1 as described above and can thereby inhibit gelation even with the composition that is likely to cause gelation.

As illustrated in FIG. 1(A) and FIG. 1(C), the first lithium-metal composite oxide 10 contains the secondary particle 2 formed of the flocculated primary particles 1. The first lithium-metal composite oxide 10 may contain a small amount of single primary particles 1 such as a primary particle 1 that has not been flocculated as the secondary particle 2 and a primary particle 1 that has fallen from the secondary particle 2 after being flocculated, for example. The positive electrode active material 20 may contain a lithium-metal composite oxide other than the first lithium-metal composite oxide 10 to the extent that the effects of the present invention are not impaired.

(First Compound)

The first compound 3 is a compound containing lithium and boron (the LB compound) and preferably contains lithium borate. Examples of lithium borate include $LiBO_2$, hydrates thereof, $Li_3BO_3$, and mixtures thereof. The first compound 3 may be lithium metaborate ($LiBO_2 \cdot 2H_2O$), for example.

The first compound 3 (the LB compound) present on the surface of the primary particle 1a exposed to the surface of the secondary particle 2 can be determined by X-ray diffraction (XRD) or X-ray photoelectron spectroscopy (XPS), for example. As described below, when the positive electrode active material 20 obtained by mixing the fired powder and the third compound (the B compound) together was analyzed by XRD, the first compound 3 (the LB compound) present on the surface of the primary particle 1a (the secondary particle 2) was detected.

Boron (B) present on the surfaces of the primary particle 1b within the secondary particle 2 can be determined with a soft X-ray emission spectroscopy (SXES) apparatus mounted on a field emission scanning electron microscope (FE-SEM), for example. Although it is difficult to directly determine the presence form of a minute amount of boron (B) present on the surface of the primary particle 1b (within the secondary particle 2), considering that (i) lithium is considered to be an element forming a compound with boron and (ii) the presence of the first compound 3 (the LB compound) is observed on the surface of the primary particle 1a, it is estimated that the first compound 3 (the LB compound) is formed also on the surface of the primary particles 1b (within the secondary particle 2). Part of boron (B) within the positive electrode active material 20 may be solid-solved in the first lithium-metal composite oxide 10.

The first compound 3 (the LB compound) may cover only part of the surfaces of the primary particles 1 or cover the entire surfaces of the primary particles 1. The first compound 3 (the LB compound) is only required to cover at least part of the surfaces of the primary particles 1, and when the positive electrode active material 20 is observed with a scanning electron microscope (SEM), the first compound 3 is not necessarily recognized as a clear covering layer. Even when the first compound 3 is partially formed on the surfaces of the primary particles 1 after the excessive lithium present on the surfaces of the primary particles 1 of the fired powder (that is, the contact surface with the electrolyte solution) or the lithium of the crystal part is extracted and reacted, the effect of inhibiting gelation of the paste is obtained, and output characteristics and battery capacity are maintained in the secondary battery to be obtained.

(Boron Content)

When the positive electrode active material 20 contains the first compound 3, the positive electrode active material 20 has a boron content of at least 0.01% by mass and up to 0.5% by mass and preferably at least 0.01% by mass and up to 0.4% by mass. When the boron content is within the above range, the excessive lithium in the fired powder and the lithium forming the crystal part can be immobilized to the surfaces of the primary particles 1, and the eluted lithium amount of the positive electrode active material 20 can be controlled to a range described below. With this control, gelation of the paste can be inhibited, and a secondary battery excellent in output characteristics and battery capacity can be obtained. When the boron content is less than 0.01% by mass, immobilization of eluted lithium (including the excessive lithium) is insufficient, and the paste may gelate. When the boron content is greater than 0.5% by mass, the positive electrode resistance increases, and battery characteristics reduce.

(Second Compound)

The second compound 4 is a compound containing lithium and tungsten (the LW compound) and preferably contains lithium tungstate. Examples of lithium tungstate include $Li_2WO_4$, $Li_4WO_5$, and $Li_6W_2O_9$.

The presence of the second compound 4 (the LW compound) present on the surface of the primary particle 1a exposed to the surface of the secondary particle 2 can be determined by X-ray diffraction (XRD) or X-ray photoelectron spectroscopy (XPS), for example. As described below, when the positive electrode active material 20 obtained by mixing the fired powder and the fourth compound (the W compound) together was analyzed by XPS, tungsten contained in the second compound 4 (the LW compound) present on the surface of the primary particle 1a (the secondary particle 2) was detected.

Tungsten (W) present on the surface of the primary particle 1b within the secondary particle 2 can be determined with a soft X-ray emission spectroscopy (SXES) apparatus mounted on a field emission scanning electron microscope (FE-SEM), for example. Although it is difficult to directly determine the presence form of a minute amount of tungsten (W) present on the surface of the primary particle 1b (within the secondary particle 2), considering that (i) lithium is considered to be an element forming a compound with tungsten and (ii) the presence of the second compound 4 (the LW compound) is determined on the surface of the primary particle 1a, it is estimated that the second compound 4 (the LW compound) is formed also on the surface of the primary particle 1b (within the secondary particle 2). Part of tungsten (W) within the positive electrode active material 20 may be solid-solved in the first lithium-metal composite oxide 10.

The second compound 4 (the LW compound) may cover only part of the surfaces of the primary particles 1 or cover the entire surfaces of the primary particles 1. The second compound 4 (the LW compound) is only required to cover at least part of the surfaces of the primary particles 1, and when the positive electrode active material 20 is observed with a SEM, the second compound 4 is not necessarily required to be recognized as a clear covering layer. Even when the second compound 4 is partially formed on the surfaces of the primary particles 1 after the unreacted lithium compound present on the surfaces of the primary particles 1 of the fired powder (that is, the contact surface with the electrolyte solution) or the lithium of the crystal part is extracted and reacted, the effect of inhibiting gelation of the paste is obtained, and output characteristics and battery capacity are maintained in the secondary battery to be obtained.

(Tungsten Content)

When the positive electrode active material 20 contains the second compound 4, the positive electrode active material 20 has a tungsten content of at least 0.01% by mass and up to 1.0% by mass and preferably at least 0.01% by mass and up to 0.5% by mass. The tungsten content is within the above range, whereby the eluted lithium in the fired powder (including the excessive lithium and lithium eluted from the crystal part) can be immobilized to the surfaces of the primary particles 1. With this immobilization, gelation of the paste is inhibited, and a secondary battery excellent in output characteristics and battery capacity can be obtained. When the tungsten content is less than 0.01%, immobilization of the excessive lithium in the fired powder and the lithium eluted from the crystal part is insufficient, and the paste gelates. When the tungsten content is greater than 1.0% by mass, the positive electrode resistance increases, and battery characteristics reduce.

(Eluted Lithium Amount of Positive Electrode Active Material)

The inventors of the present invention have found out that lithium eluted to the paste (hereinafter, the lithium is also collectively referred to as "eluted lithium") contributes to gelation of the positive electrode mixture paste and it is important to control the eluted lithium amount to a specific range in order to sufficiently inhibit gelation of the paste in the positive electrode active material 20.

The amount of lithium eluted when the positive electrode active material 20 is dispersed in water measured by neutralization titration (hereinafter, also referred to as an "eluted lithium amount of the positive electrode active material") is preferably at least 0.01% by mass and less than 0.4% by mass and more preferably at least 0.01% by mass and up to 0.35% by mass relative to the entire positive electrode active material. When the eluted lithium amount of the positive electrode active material is within the above range, excellent battery characteristics are achieved in a secondary battery, and gelation of the paste can be inhibited.

On the other hand, when the eluted lithium amount of the positive electrode active material is 0.4% by mass or more, gelation of the paste cannot necessarily sufficiently be inhibited. When the eluted lithium amount of the positive electrode active material is less than 0.01% by mass, the third compound (the B compound) and/or the fourth compound (the W compound) excessively form the first compound (the LB compound) and/or the second compound (the LW compound) while extracting lithium from the second lithium-metal composite oxide, and the positive electrode resistance may increase, and battery characteristics may reduce.

Figure 2C:
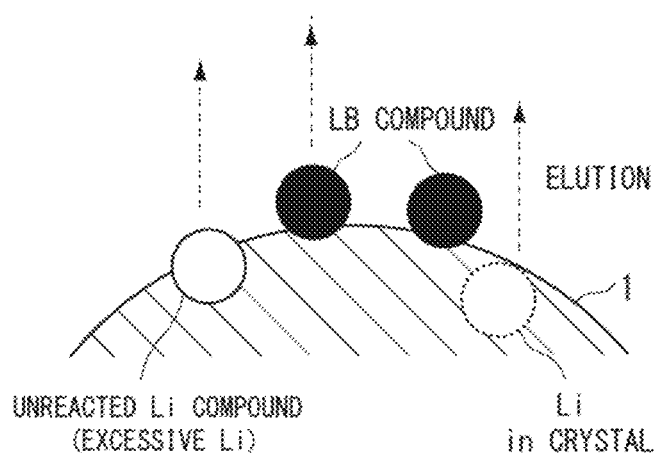
FIG. 2(C) is an illustrative diagram of exemplary eluted lithium of a positive electrode active material according to the present embodiment.

As illustrated in FIG. 2(C), the eluted lithium amount of the positive electrode active material refers to the sum of, when the positive electrode active material 20 is dispersed in water, excessive lithium derived from an unreacted lithium compound eluted to water in the first lithium-metal composite oxide 10 and lithium eluted from the crystal part to water and lithium derived from the first compound (the LB compound) and/or the second compound (the LW compound) eluted to water. The degree of elution of lithium to the paste can be evaluated by the eluted lithium amount of the positive electrode active material.

The eluted lithium amount of the positive electrode active material specifically refers to the sum of a Li amount measured from the amount of acid used until a first point of neutralization and a Li amount measured from the amount of acid used until a second point of neutralization by neutralization titration in the amount of lithium (Li) eluted when the positive electrode active material 20 is dispersed in water. For the acid used for neutralization titration, hydrochloric acid can be used, for example.

When an aqueous solution containing lithium eluted from the positive electrode active material 20 is subjected to neutralization titration using acid, the pH of the aqueous solution reduces in two stages. First, in the first lithium-metal composite oxide 10, lithium hydroxide remaining as unreacted excessive lithium and the lithium eluted from the crystal part are neutralized at a first-stage pH. Lithium carbonate remaining as unreacted excessive lithium is neutralized at a second-stage pH. Furthermore, at least part of the first compound 3 or the second compound 4 is neutralized at the first-stage or second-stage pH. Consequently, it can be said that the lithium amount calculated from the amount of the acid (e.g., hydrochloric acid) used until the first point of neutralization and the amount of the acid (e.g., hydrochloric acid) used until the second point of neutralization includes the excessive lithium in the first lithium-metal composite oxide 10 and the lithium eluted from the crystal part to water and the lithium derived from the first compound (the LB compound) and/or the second compound (the LW compound).

The following describes a specific example of a method for measuring the eluted lithium amount. The eluted lithium amount can be calculated by sufficiently dispersing 15 g of the positive electrode active material in 75 ml of pure water, allowing the resultant product to stand for 10 minutes, and then using an aqueous solution obtained by diluting the supernatant with 50 ml of pure water, measuring a lithium amount eluted to the aqueous solution by titration. The pH of the aqueous solution of the supernatant reduces in two stages by neutralization titration with acid; the pH reducing at a first stage is considered to indicate pH reducing by the neutralization of lithium hydroxide remaining as the excessive lithium in the first lithium-metal composite oxide 10 and the lithium eluted from the crystal part to water and the lithium derived from part of the LB compound or the LW compound. The pH reducing at a second stage is considered to indicate pH reducing by the neutralization of lithium carbonate remaining as the excessive lithium in the first lithium-metal composite oxide 10 and the lithium derived from part of the LB compound or the LW compound.

(Average Particle Diameter)

The average particle diameter of the positive electrode active material is at least 5 μm and up to 30 μm, for example, and preferably at least 5 μm and up to 20 μm. The average particle diameter is a volume-based average particle diameter measured by laser diffraction scattering. Furthermore, [(d90−d10)/Average particle diameter] as an indicator indicating a spread of particle size distribution is preferably at least 0.70 and more preferably at least 0.70 and up to 1.2. By having such an average particle diameter and particle size distribution, a positive electrode active material having high fillability can be obtained.

While d10 means a particle diameter at which, when the numbers of particles of the respective particle diameters are accumulated from a smaller particle diameter, the accumulated volume reaches 10% of the total volume of all the particles, d90 means a particle diameter at which, when the numbers of particles are accumulated similarly, the accumulated volume reaches 90% of the total volume of all the particles. Both d10 and d90 can be determined from a volume integral value measured with a laser diffraction/scattering particle size analyzer similarly to the average particle diameter.

2. Method for Producing Positive Electrode Active Material for Nonaqueous Electrolyte Secondary Battery FIG. 3(A) to FIG. 3(C) are diagrams of exemplary methods for producing a positive electrode active material for a nonaqueous electrolyte secondary battery of the present embodiment (hereinafter, also referred to as a "method for producing a positive electrode active material"). The method for producing a positive electrode active material can produce the positive electrode active material 20 easily on an industrial scale.

As illustrated in FIG. 3(A) to FIG. 3(C), the method for producing a positive electrode active material includes mixing the fired powder and either one or both of the third compound containing boron (the B compound) and the fourth compound containing tungsten (the W compound) together to obtain a positive electrode active material (Step S1). The third compound and the fourth compound are solid compounds that do not contain lithium and are capable of reacting with lithium, and the positive electrode active material to be obtained contains either one or both of the first compound (the LB compound) and the second compound (the LW compound).

The third compound and the fourth compound are mixed so as to satisfy either one or both of the following conditions (3) and (4):

(3) a boron content is at least 0.01% by mass and up to 0.5% by mass relative to the entire positive electrode active material;

(4) a tungsten content is at least 0.01% by mass and up to 1.0% by mass relative to the entire positive electrode active material.

The method for producing the positive electrode active material may mix the fired powder and the third compound together to obtain a positive electrode active material containing the first compound as illustrated in FIG. 3(A) or mix the fired powder and the fourth compound together to obtain a positive electrode active material containing the second compound, as illustrated in FIG. 3(B), for example. The method for producing the positive electrode active material may mix the fired powder and both the third compound and the fourth compound together to obtain a positive electrode active material containing both the first compound and the second compound as illustrated in FIG. 3(C), for example. Among them, when the fired powder and the third compound are mixed together to obtain the positive electrode active material as illustrated in FIG. 3(A), a paste produced using this positive electrode active material is further inhibited from gelating.

The following describes materials used for the method for producing a positive electrode active material.

(Fired Powder (Second Lithium-Metal Composite Oxide))

The fired powder contains the second lithium-metal composite oxide having a crystal structure with a layered structure and represented by General Formula (2): $Li_{s1}Ni_{1-x1-y1-z1}Co_{x1}Mn_{y1}M_{z1}O_{2+\alpha}$ (where $0 \le x2 \le 0.35$, $0 \le y2 \le 0.35$, $0 \le z2 \le 0.10$, $0.95 < s2 < 1.30$, and $0 \le \alpha' \le 0.2$; and M is at least one element selected from V, Mg, Mo, Nb, Ti, W, and Al). The fired powder contains a secondary particle formed of a plurality of flocculated primary particles.

The particle structure and the powder characteristics of the fired powder succeed to the positive electrode active material, and the composition, the particle structure, the powder characteristics, and the like of the fired powder can be the same as those of the positive electrode active material 20 except that the first compound 3 and/or the second compound 4 are not contained. That is to say, the fired powder can be selected as appropriate in accordance with the positive electrode active material to be obtained.

(Eluted Lithium Amount of Fired Powder)

A lithium amount eluted when the fired powder is dispersed in water measured by neutralization titration (hereinafter, also referred to as an "eluted lithium amount of the fired powder") is at least 0.05% by mass and up to 1.0% by mass and preferably at least 0.05% by mass and up to 0.5% by mass relative to the entire fired powder. When the eluted lithium amount of the fired powder is within the above range, the third compound or the fourth compound that has been mixed and the excessive lithium and the lithium eluted from the crystal part of the fired powder are reacted with each other, and a sufficient amount of the first compound (the LB compound) or the second compound (the LW compound) can be formed on the surfaces of the primary particles. Consequently, gelation of a paste produced using the positive electrode active material can be inhibited, and the output characteristics and the battery capacity of the secondary battery can be further improved.

On the other hand, when the eluted lithium amount of the fired powder is less than 0.05% by mass, the first compound 3 (the LB compound) or the second compound 4 (the LW compound) to be formed is not sufficient, and battery characteristics may reduce. When the eluted lithium amount of the fired powder is greater than 1.0% by mass, even when the fired powder is mixed with the third compound (the B compound) or the fourth compound (the W compound), the eluted lithium amount of the positive electrode active material to be obtained is large, and gelation of the paste cannot necessarily sufficiently be inhibited.

The eluted lithium amount in the fired powder can be measured by neutralization titration for the supernatant using acid similarly to the eluted lithium amount of the positive electrode active material 20 described above. In the fired powder, the first compound (the LB compound) or the second compound (the LW compound) formed by the reaction of the third compound (the B compound) or the fourth compound (the W compound) and the excessive lithium and the lithium eluted from the crystal part of the fired powder is not present, and the eluted lithium amount in the fired powder is mainly the sum of the excessive lithium (the unreacted lithium compound) contained in the fired powder and the lithium eluted from the crystal part.

(Method for Producing Fired Powder)

The method for producing the fired powder is not limited to a particular method, and known methods for producing a lithium-metal composite oxide can be used. The fired powder can be produced by mixing a nickel-metal composite hydroxide obtained by crystallization and/or a nickel-metal composite oxide obtained by performing oxidizing roasting on the nickel-metal composite hydroxide and a lithium compound together to obtain a lithium mixture and then firing the lithium mixture, for example.

The nickel-metal composite hydroxide can be produced using a batch method and/or a continuous method. In view of improving the fillability of the positive electrode active material to be obtained, preferably used is the continuous method that continuously collects the nickel composite hydroxide overflowed from a reaction vessel. When the continuous method is used, the value of [(d90−d10)/the average particle diameter] of the positive electrode active material 20 can be increased, and the fillability of the positive electrode active material improves.

The firing temperature of the lithium mixture, which is not limited to a particular temperature, is preferably adjusted such that the amount of lithium eluted when the fired powder to be obtained is dispersed in water is within a range described below. When the firing temperature is high, the eluted lithium amount of the fired powder tends to decrease, and the firing temperature is preferably adjusted such that the crystallinity of the fired powder is sufficiently high and the eluted lithium amount is within a specific range.

(Average Particle Diameter of Fired Powder)

The average particle diameter of the fired powder is at least 5 µm and up to 30 µm, for example, and preferably at least 5 µm and up to 20 µm. The average particle diameter of the third compound and the fourth compound can be at least 0.1 time and up to 100 times and may be at least 0.5 time and up to 50 times the average particle diameter of the fired powder. For at least part of the third compound and the fourth compound, a compound containing a larger particle diameter than the particle diameter of the fired powder is preferably used.

(Third Compound)

The third compound is a compound that does not contain lithium and contains boron (the B compound) and is a solid compound capable of reacting with lithium. The third compound (the B compound) is preferably powder and is preferably dry mixed with the fired powder in the form of powder.

The third compound is mixed with the fired powder such that the boron content is at least 0.01% by mass and up to 0.5% by mass and preferably at least 0.01% by mass and up to 0.4% by mass relative to the entire positive electrode active material. The third compound is mixed therewith within the above range, whereby a sufficient amount of the first compound (the LB compound) can be formed.

Examples of the third compound, which is not limited to a particular compound so long as it is a solid compound capable of reacting with lithium, include boron oxide ($B_2O_3$), boric acid ($H_3BO_3$), ammonium tetraborate tetrahydrate (($NH_4)_2B_4O_7 \cdot 4H_2O$), and ammonium pentaborate octahydrate (($NH_4)_2O \cdot 5B_2O_3 \cdot 8H_2O$). Among these, in view of being excellent in reactivity with lithium, boron oxide and boric acid are preferred. For the third compound, one may be used singly, or two or more may be used in a mixed manner.

The form of the third compound is preferably a compound having a layered structure with an average particle diameter of at least 5 µm and up to 400 µm and more preferably a compound having a layered structure with an average particle diameter of at least 5 µm and up to 350 µm. A secondary particle formed of flocculated primary particles may be used, in which preferred is a secondary particle formed of flocculated primary particles with an average particle diameter of at least 0.01 µm and up to 0.2 µm. The form of the third compound is made within the above range, whereby the distribution of boron within the positive electrode active material is made uniform, and further, the reaction between the excessive lithium in the fired powder and the lithium eluted from the crystal part and the third compound (the B compound) is facilitated to enable a larger amount of the first compound (the LB compound) to be formed. The average particle diameter of the third compound refers to a volume-based average particle diameter measured with a vacuum dispersion image analysis particle size distribution analyzer.

(Fourth Compound)

The fourth compound is a compound that does not contain lithium and contains tungsten (the W compound) and is a solid compound capable of reacting with lithium. The tungsten compound is preferably powder and is preferably dry mixed with the fired powder in the form of powder.

The fourth compound is mixed with the fired powder so as to give a tungsten amount of at least 0.01% by mass and up to 1.0% by mass and preferably at least 0.01% by mass and up to 0.5% by mass relative to the entire positive electrode active material. The fourth compound is mixed therewith within the above range, whereby a sufficient amount of the second compound (the LW compound) can be formed.

Examples of the fourth compound include tungsten dioxide ($WO_2$), tungsten trioxide ($WO_3$), and tungstic acid ($H_2WO_4$). Among these, in view of being excellent in reactivity with lithium, tungstic acid ($H_2WO_4$) is preferred. For the fourth compound, one may be used singly, or two or more may be used in a mixed manner.

The form of the fourth compound is preferably a secondary particle formed of flocculated primary particles; when tungstic acid ($H_2WO_4$) is used, preferred is a secondary particle formed of flocculated primary particles with an average particle diameter of at least 0.01 µm and up to 0.2 µm.

In the fourth compound, the secondary particle has an average particle diameter of preferably at least 1 µm and up to 200 µm and more preferably at least 1 µm and up to 100 µm. The tungsten compound is made powder, and further, the average particle diameter thereof is made within the above range, whereby the distribution of tungsten within the positive electrode active material is made uniform, and further, the reaction between the excessive lithium in the fired powder and the lithium eluted from the crystal part and the fourth compound (the W compound) is facilitated to enable a larger amount of the second compound (the LW compound) to be formed. The average particle diameter of the fourth compound refers to a volume-based average particle diameter measured with a vacuum dispersion image analysis particle size distribution analyzer.

(Adjustment of Eluted Lithium Amount of Positive Electrode Active Material)

The amount of either one or both of the third compound and the fourth compound to be mixed is preferably adjusted such that the amount of lithium eluted when the positive electrode active material is dispersed in water measured by neutralization titration (the eluted lithium amount of the positive electrode active material) is at least 0.01% by mass and less than 0.4% by mass relative to the entire positive electrode active material. When the eluted lithium amount of the positive electrode active material is within the above range, gelation of the paste can be further inhibited, and a secondary battery excellent in battery characteristics can be obtained.

Even when the eluted lithium amount of the positive electrode active material is within a range of at least 0.1% by mass and less than 0.4% by mass, gelation of the paste can be sufficiently inhibited. Furthermore, by adjusting the eluted lithium amount of the fired powder is adjusted, even when the eluted lithium amount of the positive electrode active material is at least 0.2% by mass and less than 0.4% by mass, gelation of the paste can be inhibited.

When the eluted lithium amount of the positive electrode active material is adjusted to the above range, the amount of the third compound or the fourth compound to be mixed can be easily determined by performing a preliminary test with a small amount of the fired powder dispensed in advance to determine the eluted lithium amount of the positive electrode active material. When Li/Me and the production condition of the fired powder are stable, the amount determined by the preliminary test is mixed, whereby the eluted lithium amount of the positive electrode active material can be controlled to the above range.

(Mixing)

At the mixing process (the Step S1), the fired powder and the third compound and/or the fourth compound are mixed together sufficiently to the extent that the skeleton of the fired powder is not destroyed. The mixing is preferably performed to the extent that the shape of the third compound and/or the fourth compound is not observed with a scanning electron microscope (SEM). During the mixing, the excessive lithium and the lithium eluted from the crystal part of the fired powder and the third compound and/or the fourth compound react with each other to form the first compound and/or the second compound.

For the mixing, general mixers can be used; a shaker mixer, a Loedige mixer, a *Julia* mixer, or a V blender can be used, for example.

3. Positive Electrode Mixture Paste for Nonaqueous Electrolyte Secondary Battery The following describes a method for producing a positive electrode mixture paste for a nonaqueous electrolyte secondary battery according to the embodiment of the present invention (hereinafter, also referred to as a "paste"). In the positive electrode mixture paste of the present embodiment, elution of lithium from the positive electrode active material is reduced, and gelation of the paste is inhibited. Consequently, the paste changes less in viscosity even after long-term storage, and the paste has high stability. A positive electrode is produced using such a paste, whereby the positive electrode also has stably excellent characteristics, and the characteristics of a battery to be finally obtained can be stably high.

The positive electrode mixture paste contains a positive electrode active material. Components of the positive electrode mixture paste are not limited to particular components, and components equivalent to those of known positive electrode mixture pastes can be used. The positive electrode mixture paste contains the positive electrode active material, a conductive material, and a binder, for example. The positive electrode mixture paste may further contain an organic solvent. When the entire mass of the solid content of the positive electrode mixture except the organic solvent is 100 parts by mass, the positive electrode mixture paste preferably has a content of the positive electrode active material of 60 to 95 parts by mass, a content of the conductive material of 1 to 20 parts by mass, and a content of the binding agent of 1 to 20 parts by mass.

Examples of the conductive material include graphite (natural graphite, artificial graphite, expanded graphite, and the like) and carbon black materials such as acetylene black and Ketjen black.

Examples of the binder (binding agent), which plays a role of binding active material particles, include polyvinylidene fluoride (PVDF), polytetrafluoroethylene (PTFE), fluoro rubber, ethylene-propylene-diene rubber, styrene butadiene, cellulosic resins, and polyacrylic acid.

An organic solvent that disperses the positive electrode active material, the conductive material, and the active carbon and dissolves the binder (the binding agent) may be added to the positive electrode mixture as needed. For the organic solvent, specifically, N-methyl-2-pyrrolidone (NMP) or the like can be used. Active carbon can be added to the positive electrode mixture in order to increase electric double layer capacity. The positive electrode mixture paste can be produced by mixing the positive electrode active material in powder form, the conductive material, and the binding agent together, further adding the active carbon and the organic solvent for viscosity adjustment or the like as needed, and kneading them.

4. Nonaqueous Electrolyte Secondary Battery

The following describes a nonaqueous electrolyte secondary battery according to an embodiment. The nonaqueous electrolyte secondary battery of the present embodiment (hereinafter, also referred to simply as a "secondary battery") is not limited to a particular secondary battery and is configured by components similar to those of known nonaqueous electrolyte secondary batteries. The secondary battery includes a positive electrode, a negative electrode, a separator, and a nonaqueous electrolyte solution, for example. The embodiment described below is only by way of example, and the nonaqueous electrolyte secondary battery of the present embodiment can be performed in various modified and improved forms based on the knowledge of those skilled in the art based on the embodiment described in the present specification. The nonaqueous electrolyte secondary battery of the present embodiment does not limit its use to particular uses.

(Positive Electrode)

Using the positive electrode mixture paste containing the positive electrode active material, the positive electrode of the nonaqueous electrolyte secondary battery is produced as follows, for example.

The positive electrode mixture paste is applied to a surface of collector formed of aluminum foil and is dried to volatilize the organic solvent, for example. To increase electrode density, pressurizing may be performed with a roll press or the like as needed. The positive electrode in sheet form can thus be produced. The positive electrode in sheet form can be served for the production of a battery by being subjected to cutting or the like into appropriate size in accordance with a target battery. However, the method for producing the positive electrode is not limited to the exemplified one and may be another method.

(Negative Electrode)

The negative electrode is formed by applying a negative electrode mixture formed like a paste obtained by mixing a binding agent with metal lithium, lithium alloys, or the like or a negative electrode active material capable of occluding and de-inserting lithium ions and adding an appropriate organic solvent thereto to a surface of a metal-foil collector such as copper, drying it, and compressing it in order to increase electrode density as needed.

Examples of the negative electrode active material include organic compound fired bodies such as natural graphite, synthetic graphite, and phenol resins and powdery bodies of carbon substances such as coke. In this case, for a negative electrode binding agent, fluorine-containing resins such as PVDF or the like can be used similarly to the positive electrode; for an organic solvent dispersing the active material and the binding agent, organic solvents such as N-methyl-2-pyrrolidone can be used.

(Separator)

A separator is interposed between the positive electrode and the negative electrode. The separator separates the positive electrode and the negative electrode from each other and holds an electrolyte; examples thereof include thin films formed of polyethylene, polypropylene, or the like, the films having many minute holes.

(Nonaqueous Electrolyte Solution)

A nonaqueous electrolyte solution is a solution obtained by dissolving a lithium salt as a supporting salt in an organic solvent. Examples of the organic solvent include cyclic carbonates such as ethylene carbonate, propylene carbonate, butylene carbonate, and trifluoro propylene carbonate; chain carbonates such as diethyl carbonate, dimethyl carbonate, ethylmethyl carbonate, and dipropyl carbonate; ether compounds such as tetrahydrofuran, 2-methyltetrahydrofuran, and dimethoxy ethane; sulfur compounds such as ethylmethyl sulfone and butane sulfone; and phosphorous compounds such as triethyl phosphate and trioctyl phosphate; for the solvent, one or two or more in combination selected from the above can be used.

Examples of the supporting salt include $LiPF_6$, $LiBF_4$, $LiClO_4$, $LiAsF_6$, $LiN(CF_3SO_2)_2$ and their composite salts. Furthermore, the nonaqueous electrolyte solution may contain radical scavengers, surfactants, fire retardants, and the like.

(Shape and Configuration of Secondary Battery)

The nonaqueous electrolyte secondary battery according to the present embodiment including the positive electrode, the negative electrode, the separator, and the nonaqueous electrolyte solution described above can be formed into various shapes such as cylindrical and stacked shapes. For any shape employed, the positive electrode and the negative electrode are stacked via the separator to form an electrode body, the obtained electrode body is impregnated with the nonaqueous electrolyte solution, a positive electrode collector and a positive electrode terminal communicating with the outside and a negative electrode collector and a negative electrode terminal communicating with the outside are each connected using a collector lead, and the electrode body is hermetically sealed in a battery case to complete the nonaqueous electrolyte secondary battery.

(Characteristics)

The secondary battery containing the positive electrode active material of the present embodiment has high capacity and is excellent in inhibition of gelation. The secondary battery containing the positive electrode active material obtained in a preferred embodiment, when used for a positive electrode of a 2032 type coin battery (FIG. 4), for example, can obtain an initial discharging capacity of as high as at least 200 mAh/g. This secondary battery can provide a discharging capacity holding rate of at least 90%, for example.

The initial discharging capacity is a value obtained by measuring a capacity when a coin-type battery 1 used in examples was produced and was allowed to stand for about 24 hours, was charged to a cutoff voltage 4.3 V with a current density to the positive electrode of 0.1 $mA/cm^2$ after an open circuit voltage (OCV) stabilized, and was discharged to a cutoff voltage 3.0 V after a one-hour suspension.

Figure 5:
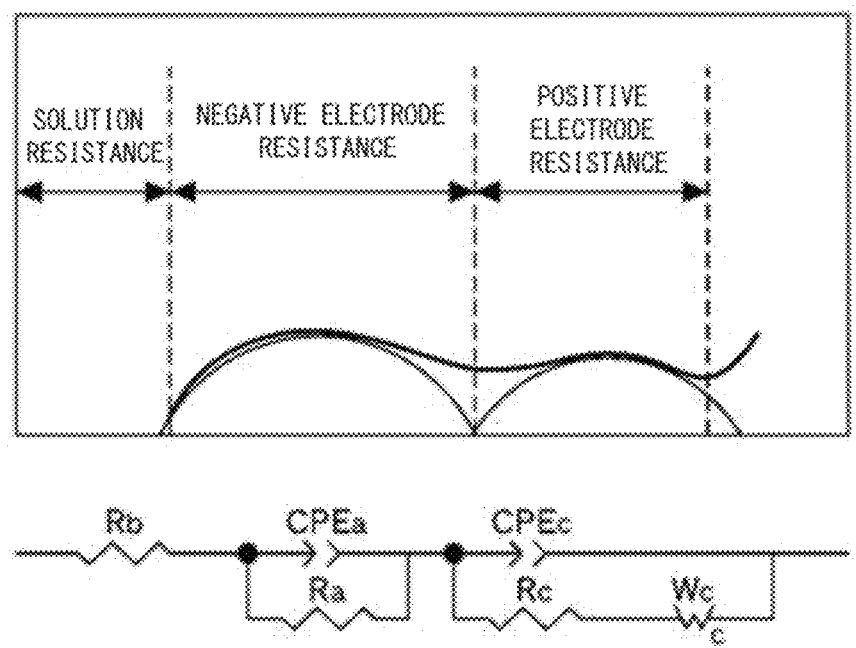
FIG. 5 is an illustrative diagram of a Nyquist plot and an equivalent circuit obtained by an AC impedance method.

The secondary battery containing the positive electrode active material obtained in a preferred embodiment can provide a positive electrode resistance measured using the coin-type battery 1 of up to 4Ω, for example. A method for measuring the positive electrode resistance in the present embodiment is exemplified as follows. When the frequency dependence of battery reaction is measured by an AC impedance method, which is general as an electrochemical evaluation method, a Nyquist diagram based on solution resistance, negative electrode resistance and negative electrode capacitance, and positive electrode resistance and positive electrode capacitance is obtained as in FIG. 5. A battery reaction in an electrode includes a resistance component associated with charge transfer and a capacitance component by an electric double layer; when they are represented by an electric circuit, a parallel circuit including a resistance and a capacitance, and the battery as a whole is represented by an equivalent circuit in which the solution resistance and the parallel circuits of the negative electrode and the positive electrode are connected in series. Fitting calculation is performed on a Nyquist diagram measured using this equivalent circuit, whereby the resistance components and the capacitance components can be estimated. The positive electrode resistance is equal to the diameter of a semicircle on the low-frequency side of the obtained Nyquist diagram. From the foregoing, AC impedance measurement is performed on the positive electrode to be produced, and fitting calculation is performed on the obtained Nyquist diagram by the equivalent circuit, whereby the positive electrode resistance can be estimated.

EXAMPLES

The following specifically describes the present invention with reference to examples of the present invention; the present invention is not limited by these examples at all. In the present examples, for composite hydroxide production and the production of positive electrode active materials and secondary batteries, samples of guaranteed reagents manufactured by Wako Pure Chemical Industries, Ltd. were used. The following describes methods of measurement and methods of evaluation used in the present examples.

[Measurement of Eluted Lithium Amount]

The obtained positive electrode active material in an amount of 15 g was dispersed in 75 ml of pure water and the resultant product was allowed to stand for 10 minutes, and 10 ml of the supernatant was diluted with 50 ml of pure water, and 1 mol/L hydrochloric acid was added thereto to perform measurement by neutralization titration. In the neutralization titration, the pH of the aqueous solution of the supernatant reduced in two stages; the amount of hydrochloric acid required until a first-stage reduction (a first point of neutralization) and the amount of hydrochloric acid required until a second-stage reduction (a second point of neutralization) were measured to calculate an eluted lithium amount. The eluted lithium amount of the fired powder (the second lithium-metal composite oxide) was also calculated by a method similar to the above.

[Evaluation of Positive Electrode Mixture Paste Stability]

A positive electrode mixture paste was produced by mixing 20.0 g of the positive electrode active material for a nonaqueous electrolyte secondary battery, 2.35 g of carbon powder as a conductive auxiliary agent, 14.7 g of KF polymer L #7208 (solid content: 8% by mass) as a binding agent, and 5.1 g of N-methyl-2-pyrrolidone (NMP) as a solvent together with a planetary centrifugal mixer. The produced positive electrode mixture paste was stored at room temperature in a sealed container, and a temporal change in paste viscosity was measured using a cone-plate viscometer (DVII+pro manufactured by Brookfield). Paste stability was evaluated based on the following criteria:

A: Even after being stored for seven or more days at room temperature, it did not gelate and held its paste form.

B: When being stored for three days at room temperature, it lost flowability to gelate.

C: When being stored for one day at room temperature, it lost flowability to gelate.

[Method for Evaluating Battery Characteristics]

Figure 4:
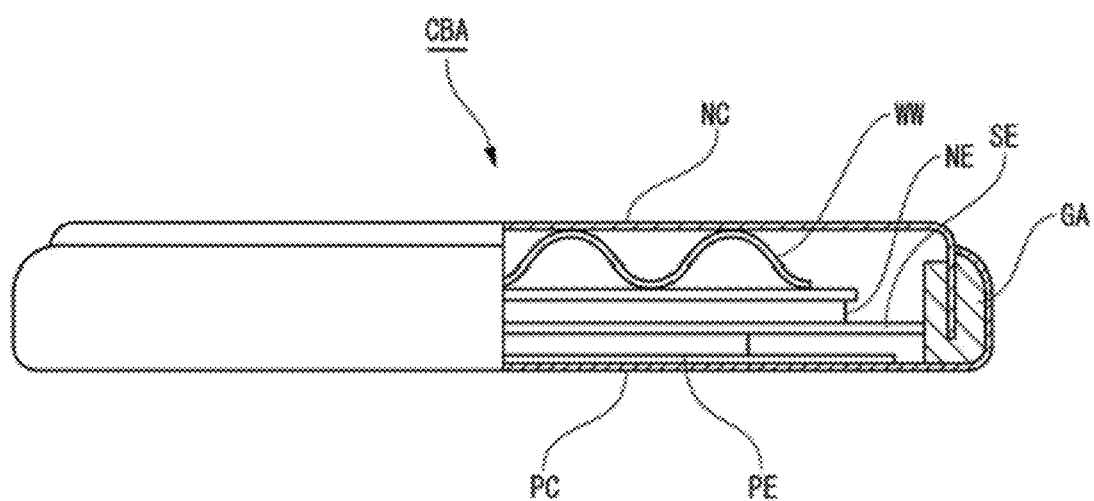
FIG. 4 is a schematic diagram of a sectional structure of a coin-type battery used for battery evaluation.

For the battery characteristics of the positive electrode active material, a 2032-type coin-type battery CBA with a configuration illustrated in FIG. 4 was produced, and then initial charging/discharging capacity and positive electrode resistance were evaluated. A positive electrode PE containing the positive electrode active material was produced by a method described below, and then the coin-type battery CBA was produced by assembling a negative electrode NE, a separator SE, a gasket GA, a wave washer WW, a positive electrode can PC, and a negative electrode can NC within a glove box with an argon atmosphere the dew point of which was controlled to −80° C.

The positive electrode PE was produced by mixing 52.5 mg of the positive electrode active material obtained in the examples and the comparative examples, 15 mg of acetylene black, and 7.5 mg of a polytetrafluoroethylene resin (PTFE) together, press-molding the mixture into a disc shape with a diameter of 13 mm and a thickness of 100 μm with a pressure of 100 MPa, and then vacuum-drying the molded object at a temperature of 120° C. for 12 hours.

For the negative electrode NE, a piece of lithium metal with a diameter of 13 mm and a thickness of 1 mm was used. For an electrolyte solution, a liquid mixture of an equivalent amount of ethylene carbonate (EC) and diethyl carbonate (DEC) with 1 M $LiClO_4$ as a supporting electrolyte (manufactured by Tomiyama Pure Chemical Industries, Ltd.) was used. For the separator SE, a polyethylene porous film with a film thickness of 25 μm was used. Using the coin-type battery CBA, the initial charging/discharging capacity and the positive electrode resistance were evaluated by the following procedure.

[Initial Charging/Discharging Capacity]

For the initial charging/discharging capacity, the coin-type battery CBA was allowed to stand for about 24 hours and was charged to a cutoff voltage 4.3 V with a current density to the positive electrode PE of 0.1 $mA/cm^2$ after an open circuit voltage (OCV) stabilized, and a capacity at that time was determined to be the initial charging capacity; and a capacity when discharged to a cutoff voltage 3.0 V after a one-hour suspension was determined to be the initial discharging capacity.

[Positive Electrode Resistance]

Figure 3:
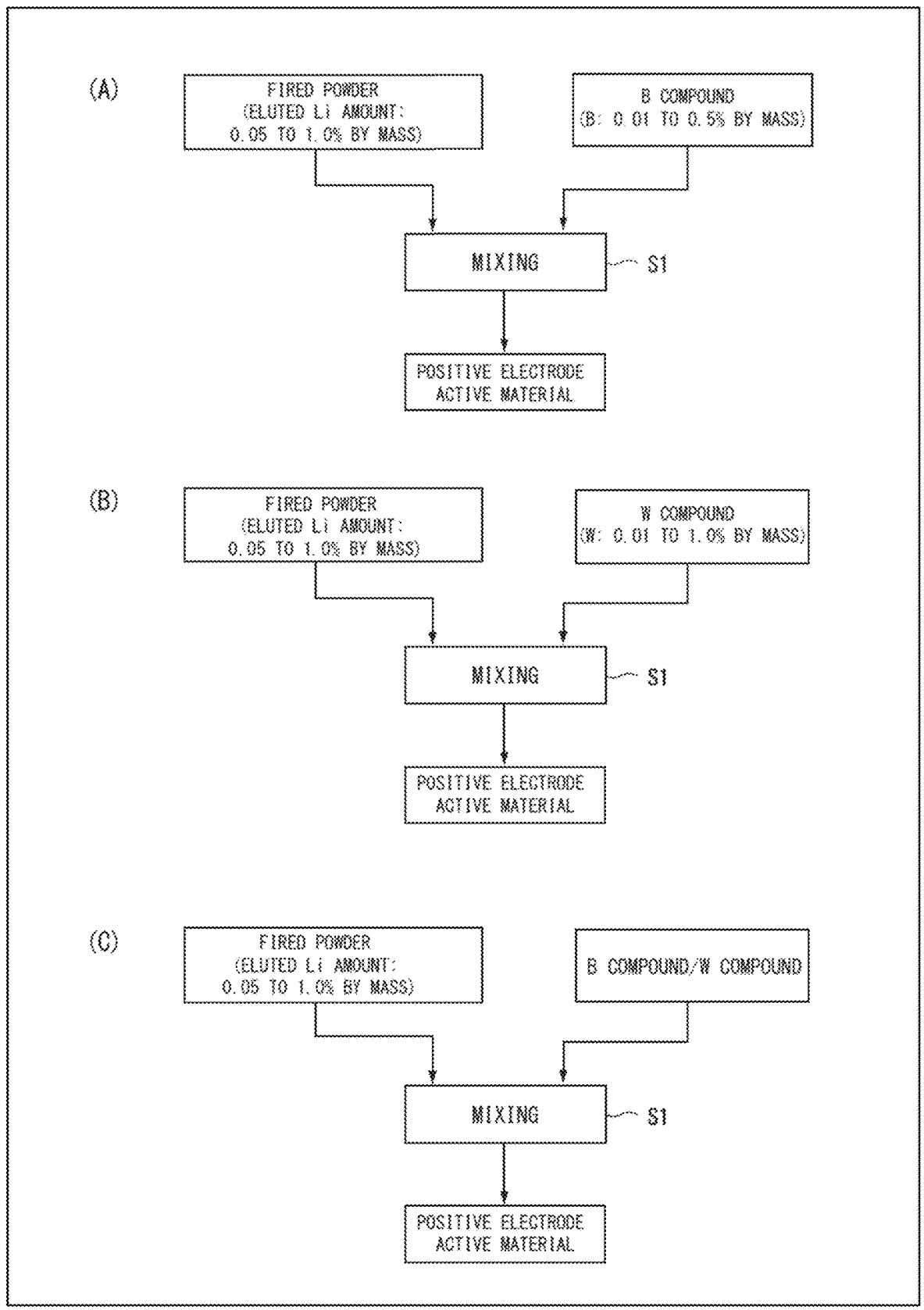
FIG. 3 include diagrams of exemplary methods for producing a positive electrode active material for a nonaqueous electrolyte secondary battery of the embodiment.

When the coin-type battery CBA is charged at a charge potential of 4.1 V, and measurement is performed by the AC impedance method using a frequency response analyzer and a potentiogalvanostat (1255B manufactured by Solartron), a Nyquist plot as illustrated in FIG. 3 is obtained. This Nyquist plot is represented as the sum of characteristic curves indicating the solution resistance, the negative electrode resistance and its capacitance, and the positive electrode resistance and its capacitance. Fitting calculation was performed using an equivalent circuit based on this Nyquist plot to calculate the value of the positive electrode resistance.

Example 1

Figure 6A:
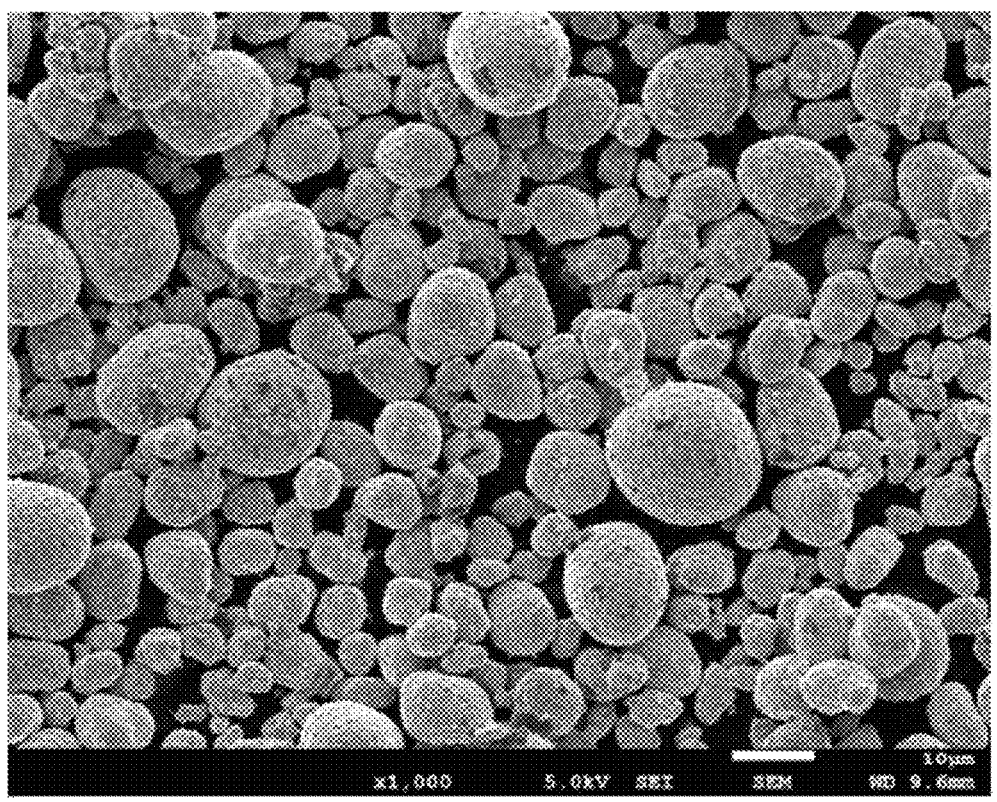
FIG. 6(A) is a scanning electron microscope (SEM) image (magnification: 1,000-fold) of a particle shape of fired powder (a second lithium-metal composite oxide) used in examples and comparative examples.
Figure 6B:
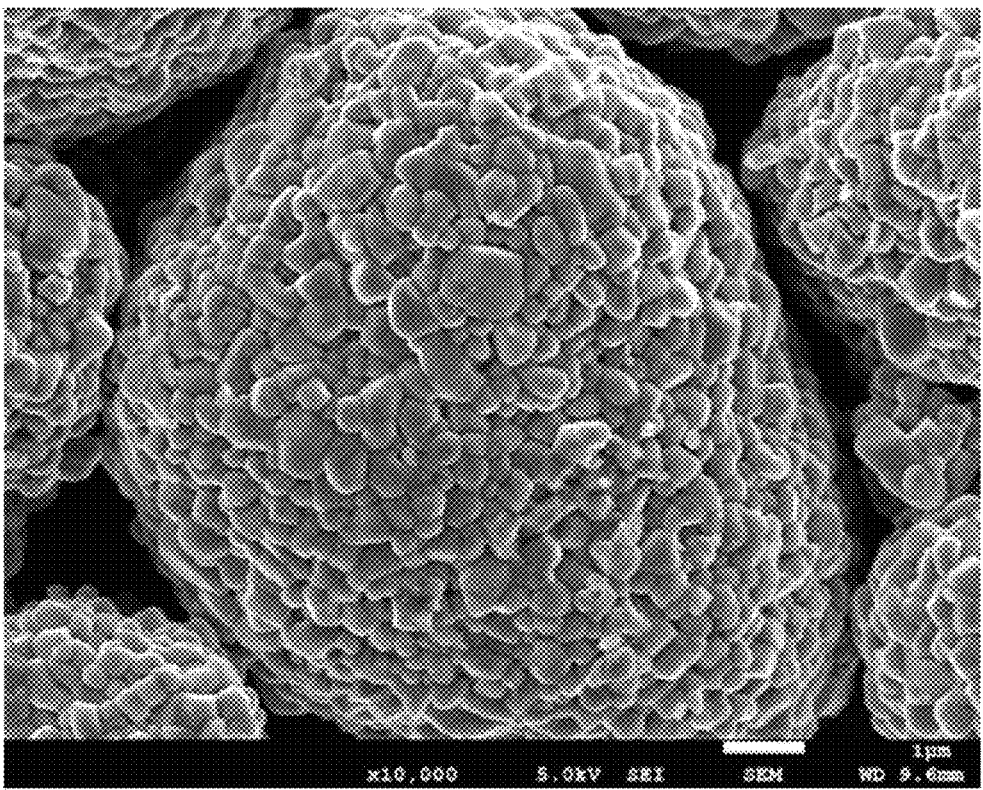
FIG. 6(B) is a SEM image (magnification: 10,000-fold) of the particle shape with magnification changed.

For the fired powder, lithium-metal composite oxide powder ($Li_{1.023}Ni_{0.88}Co_{0.09}Al_{0.03}O_2$) obtained by a known technique was used. Specifically, hydroxide powder obtained by crystallization (the continuous method) with nickel (Ni) as a main component and a lithium hydroxide powder (LiOH) were mixed together and were then fired to obtain fired powder. The obtained fired powder was observed with a scanning electron microscope (SEM) and was determined to include a secondary particle formed of a plurality of flocculated primary particles as shown in FIG. 6(A) and FIG. 6(B).

The average particle diameter (the volume average particle diameter) of the fired powder was measured by laser diffraction/scattering to be 12.0 μm, and [(d90−d10)/the average particle diameter] was 0.84. The eluted lithium amount of the fired powder was 0.40% by mass relative to the entire fired powder.

Figure 7A:
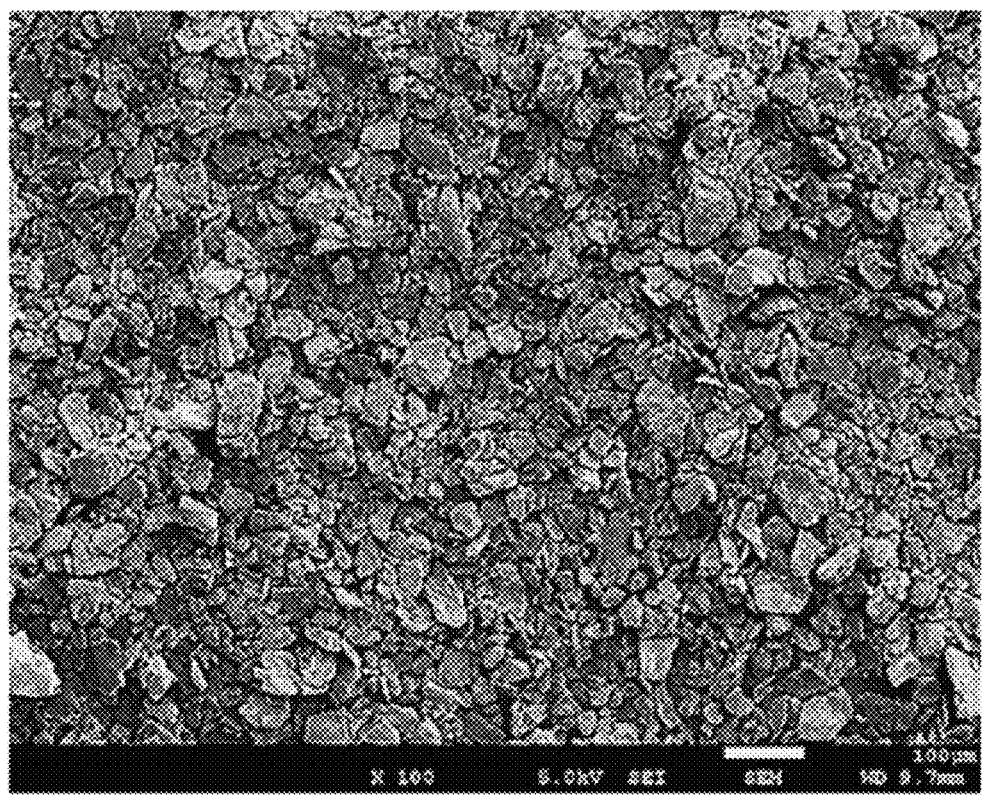
FIG. 7(A) is a SEM image (magnification: 100-fold) of an exemplary particle shape of a third compound (boric acid powder) used in Examples 1 to 3.
Figure 7B:
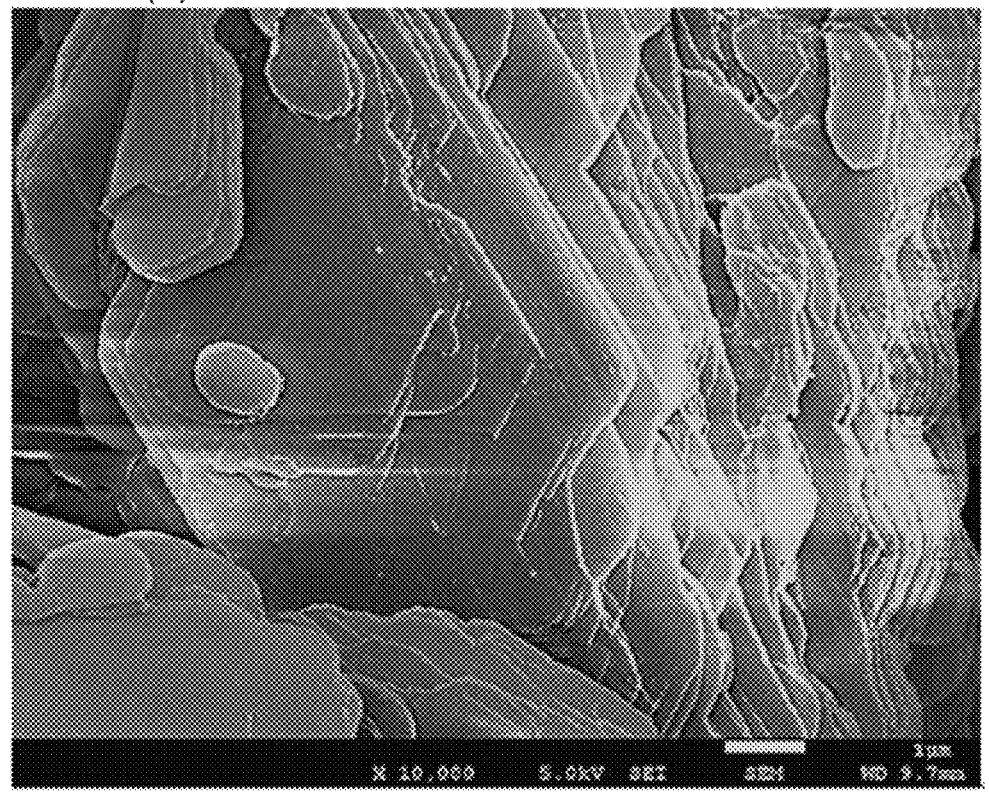
FIG. 7(B) is a SEM image (magnification: 10,000-fold) of the exemplary particle shape with magnification changed.

Boric acid ($H_3BO_3$) powder was used as the third compound (the B compound). For the boric acid ($H_3BO_3$) powder, a guaranteed reagent manufactured by Hayashi Pure Chemical Ind., Ltd. was crushed with a mortar and was then sieved with a 53-μm mesh, and the obtained minus sieve was used. The obtained boric acid powder was observed with a scanning electron microscope (SEM) and was determined to be particles with an indefinite shape having a layered structure as shown in FIG. 7. The particle diameter was measured with a vacuum dispersion image analysis particle size distribution analyzer and was determined to have a volume average particle diameter of 65 μm.

Put into a mixing vessel were 30.03 g of the fired powder and 0.12 g of the boric acid powder, which were mixed together for 10 minutes using a planetary centrifugal mixer to obtain a positive electrode active material. The obtained positive electrode active material was analyzed by ICP emission spectrometry and was determined to contain boron (B) as a boric acid component in an amount of 0.07% by mass.

Figure 15:
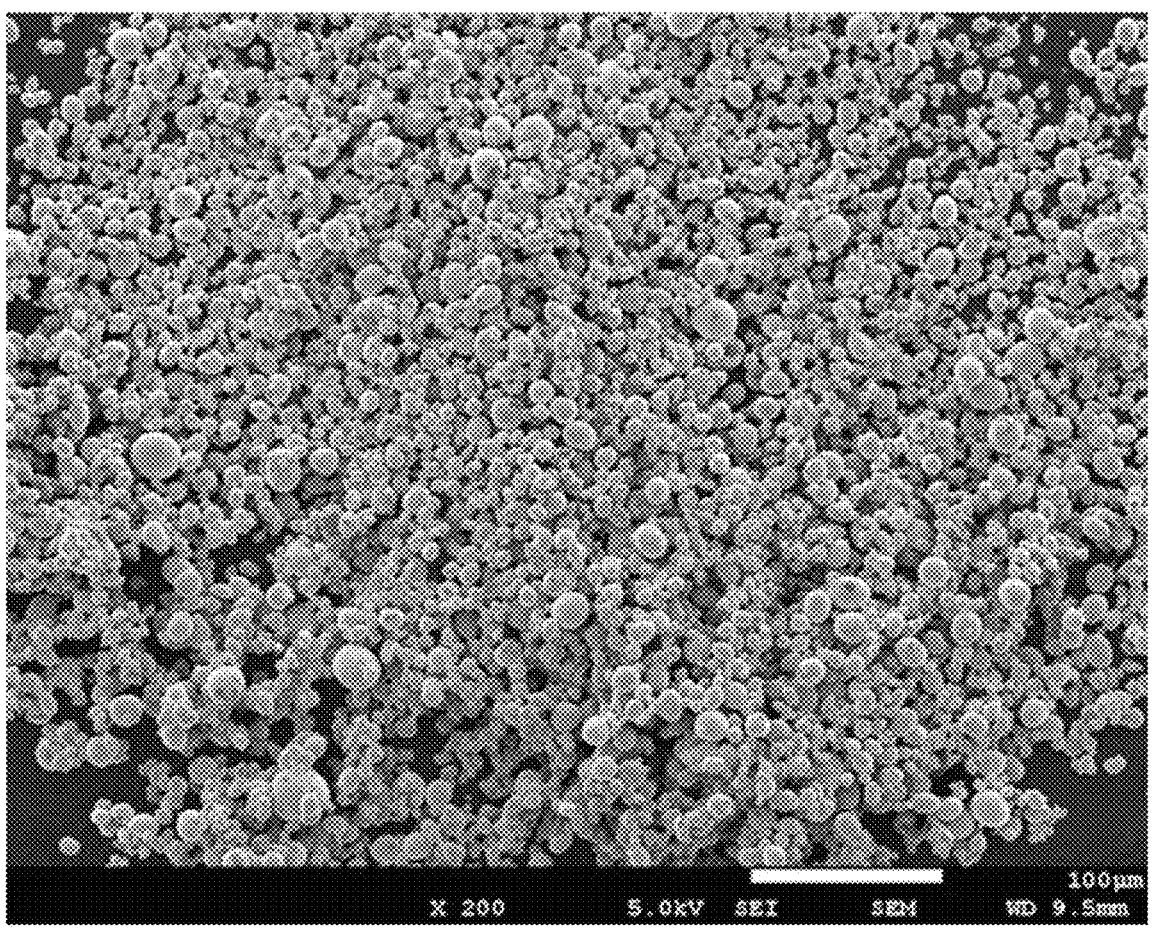
FIG. 15 is a SEM image (magnification: 200-fold) of a particle shape of a positive electrode active material according to Example 1.

When the obtained positive electrode active material was observed with a scanning electron microscope (SEM), particles with an indefinite shape having a layered structure corresponding to the boric acid powder were not recognized as shown in FIG. 15; it was considered that the boric acid powder reacted with the excessive lithium and the lithium eluted from the crystal part of the fired powder to form the LB compound. When the obtained positive electrode active material was analyzed with an X-ray diffraction apparatus (XRD), a diffraction peak of boric acid ($H_3BO_3$) was not detected, and a diffraction peak of lithium metaborate ($LiBO_2 \cdot 2H_2O$) was detected, by which it was determined that the LB compound was formed.

Figure 26:
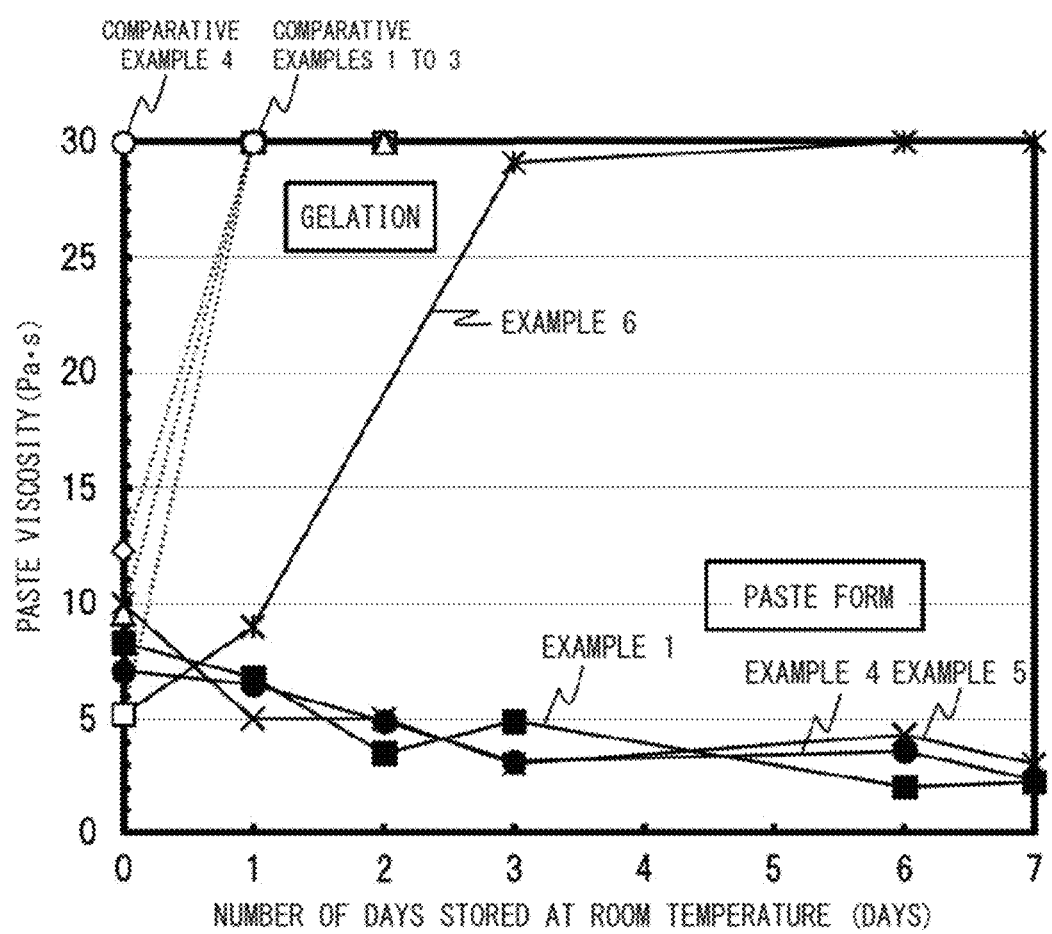
FIG. 26 is a graph of changes in the viscosity of positive electrode mixture pastes according to respective examples and respective comparative examples.

Table 1 and Table 2 list evaluation results using the obtained positive electrode active material. FIG. 26 illustrates a temporal change in the viscosity of a positive electrode mixture paste produced using the obtained positive electrode active material.

Example 2

A positive electrode active material was obtained similarly to Example 1 except that 30.59 g of the fired powder and 0.20 g of the boric acid powder were mixed together. The obtained positive electrode active material was analyzed by ICP emission spectrometry and was determined to contain boron (B) in an amount of 0.11% by mass.

Figure 16:
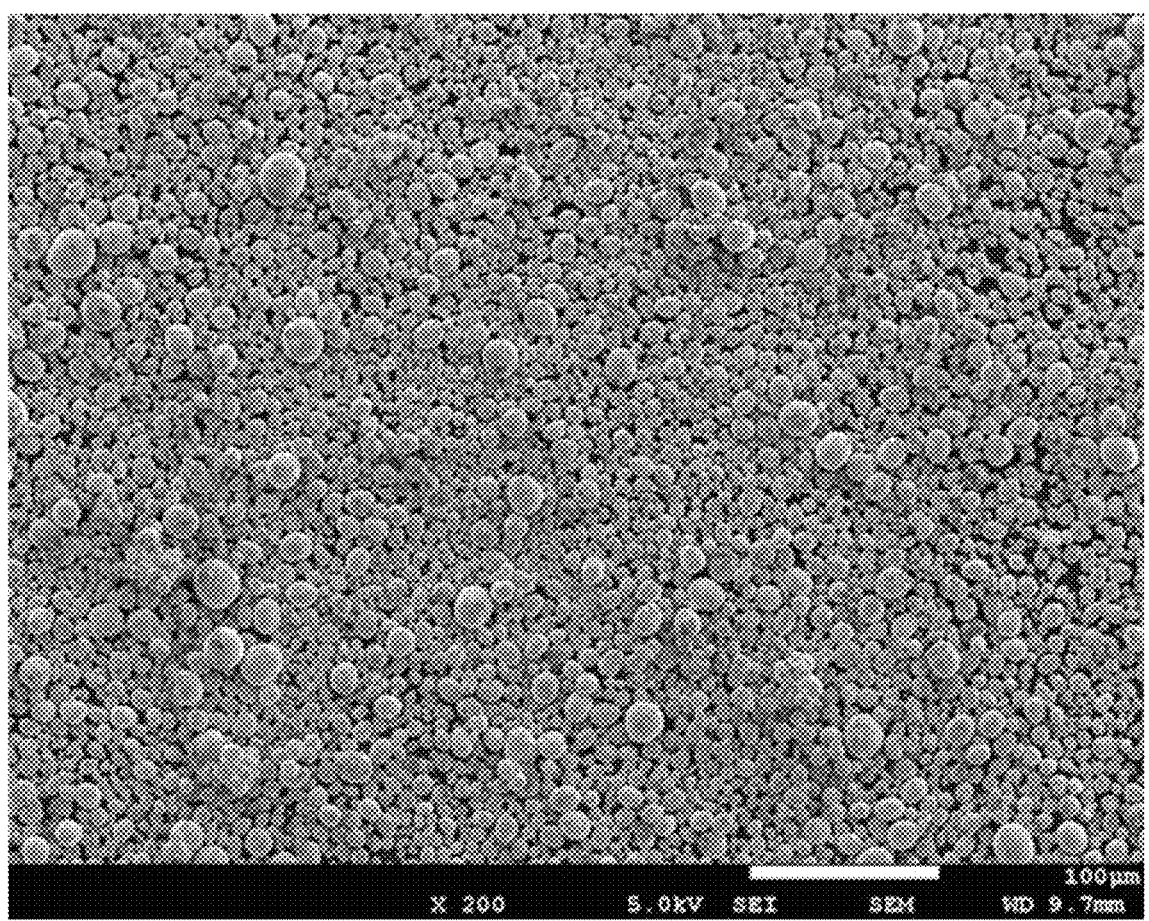
FIG. 16 is a SEM image (magnification: 200-fold) of a particle shape of a positive electrode active material according to Example 2.

When the positive electrode active material for a nonaqueous electrolyte secondary battery was observed with a scanning electron microscope (SEM), particles with an indefinite shape having a layered structure corresponding to the boric acid powder were not recognized as shown in FIG. 16; it was considered that the boric acid powder reacted with the excessive lithium and the lithium eluted from the crystal part of the fired powder to form the LB compound. Table 1 and Table 2 list evaluation results using the obtained positive electrode active material.

Example 3

A positive electrode active material was obtained similarly to Example 1 except that 30.50 g of the fired powder and 0.59 g of the boric acid powder were mixed together. The obtained positive electrode active material was analyzed by ICP emission spectrometry and was determined to contain boron (B) in an amount of 0.33% by mass.

Figure 17:
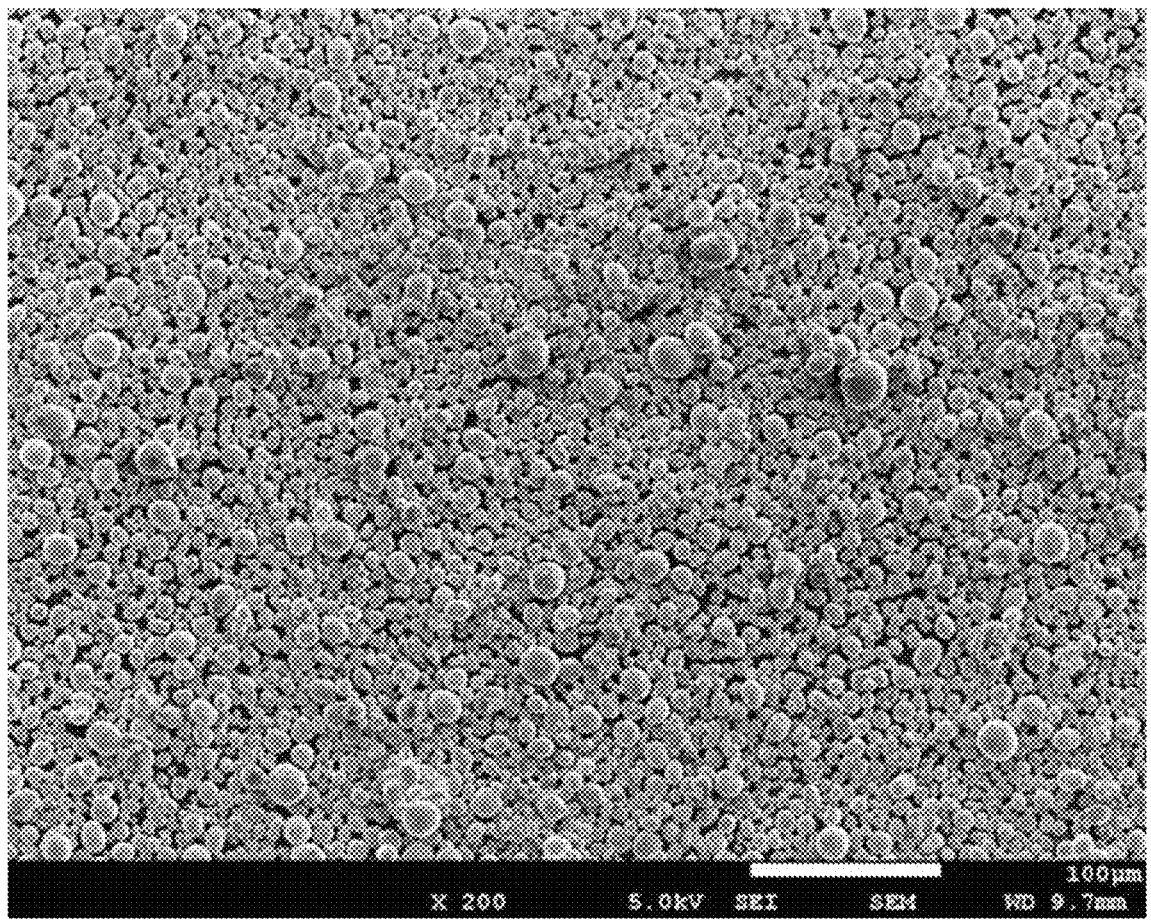
FIG. 17 is a SEM image (magnification: 200-fold) of a particle shape of a positive electrode active material according to Example 3.

When the positive electrode active material was observed with a scanning electron microscope (SEM), particles with an indefinite shape having a layered structure corresponding to the boric acid powder were not recognized as shown in FIG. 17; it was considered that the boric acid powder reacted with the excessive lithium and the lithium eluted from the crystal part of the fired powder to form the LB compound. Table 1 and Table 2 list evaluation results using the obtained positive electrode active material.

Example 4

Figure 8A:
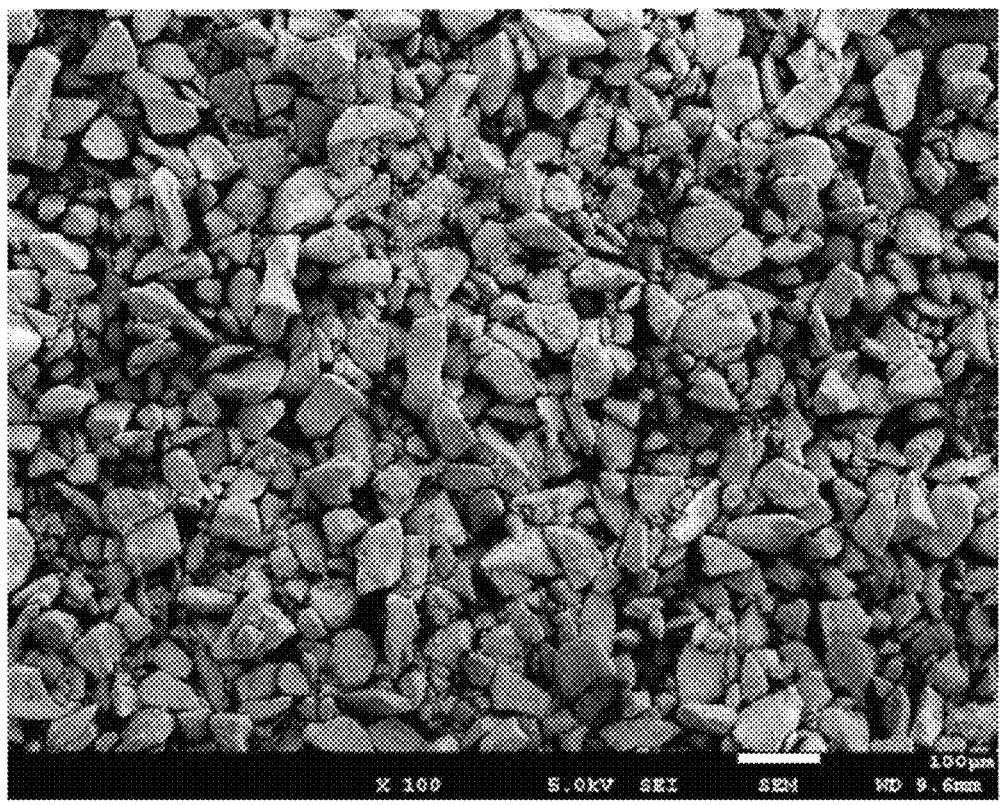
FIG. 8(A) is a SEM image (magnification: 100-fold) of an exemplary particle shape of the third compound (boron oxide powder) used in Example 4.
Figure 8B:
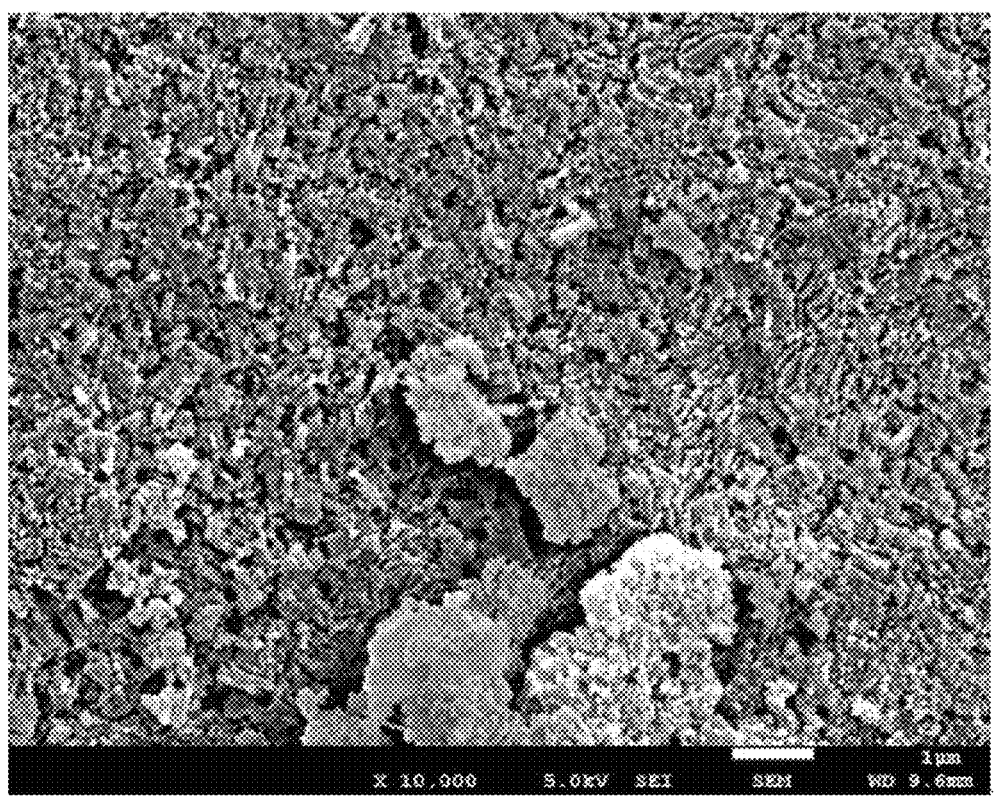
FIG. 8(B) is a SEM image (magnification: 10,000-fold) of the exemplary particle shape with magnification changed.

Boron oxide ($B_2O_3$) powder was used as the third compound (the B compound). For the boron oxide ($B_2O_3$) powder, a guaranteed reagent manufactured by Kanto Chemical Co., Inc. was crushed with a mortar and was then sieved with a 53-μm mesh, and the obtained minus sieve was used. The obtained boron oxide powder was observed with a scanning electron microscope (SEM) and was determined to be secondary particles with an indefinite shape formed of flocculated primary particles with about 0.1 μm, and the secondary particle diameter was up to 100 μm as shown in FIG. 8.

A positive electrode active material was obtained similarly to Example 1 except that 30.01 g of the fired powder and 0.06 g of the boron oxide powder were mixed together. The obtained positive electrode active material was analyzed by ICP emission spectrometry and was determined to contain boron (B) as a boron oxide component in an amount of 0.04% by mass.

Figure 18:
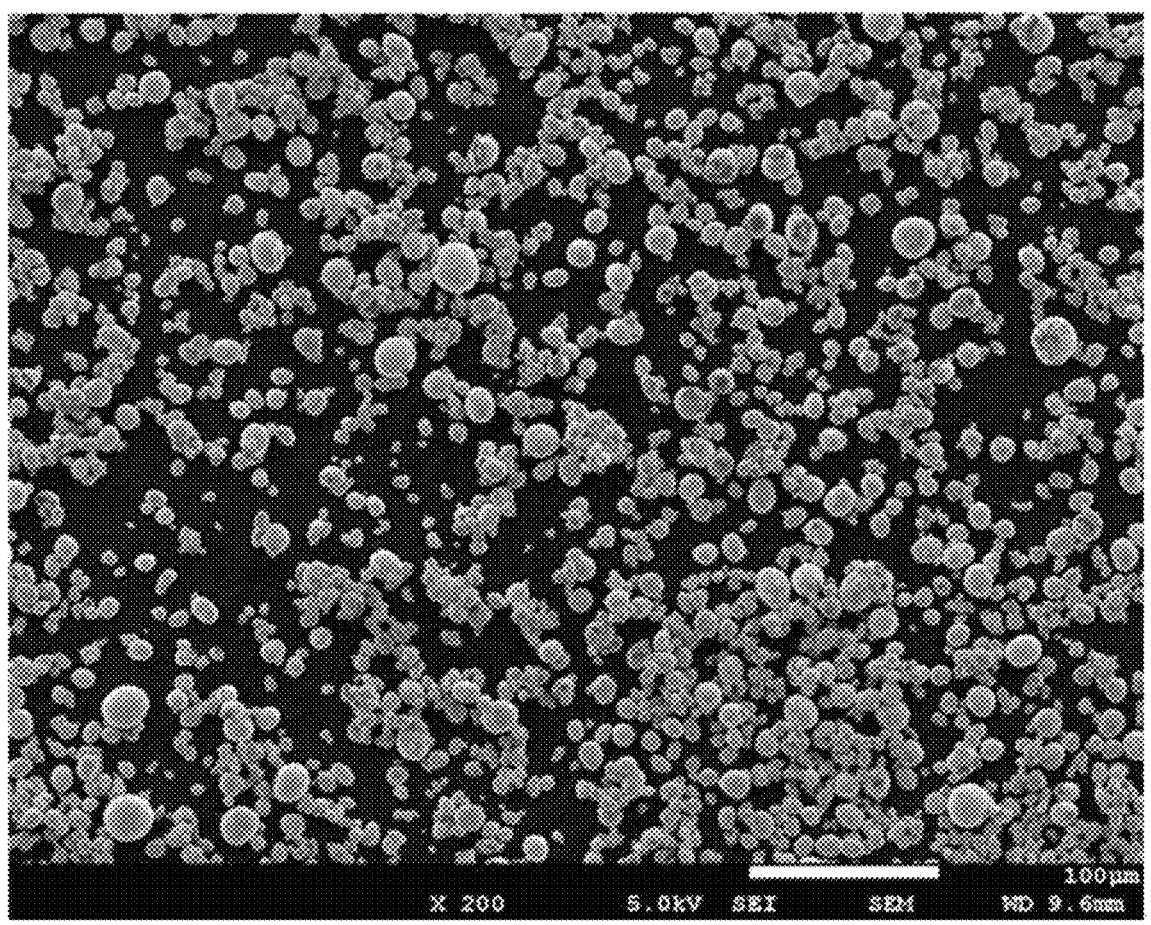
FIG. 18 is a SEM image (magnification: 200-fold) of a particle shape of a positive electrode active material according to Example 4.

When the positive electrode active material for a nonaqueous electrolyte secondary battery was observed with a scanning electron microscope (SEM), secondary particles with an indefinite shape corresponding to the boron oxide powder were not recognized as shown in FIG. 18; it was considered that the boron oxide powder reacted with the excessive lithium and the lithium eluted from the crystal part of the fired powder to form the LB compound. Table 1 and Table 2 list evaluation results using the obtained positive electrode active material. FIG. 26 illustrates a temporal change in the viscosity of a positive electrode mixture paste produced using the obtained positive electrode active material.

Example 5

Figure 9A:
FIG. 9(A) is a SEM image (magnification: 100-fold) of an exemplary particle shape of the third compound (ammonium pentaborate octahydrate powder) used in Example 5.
Figure 9B:
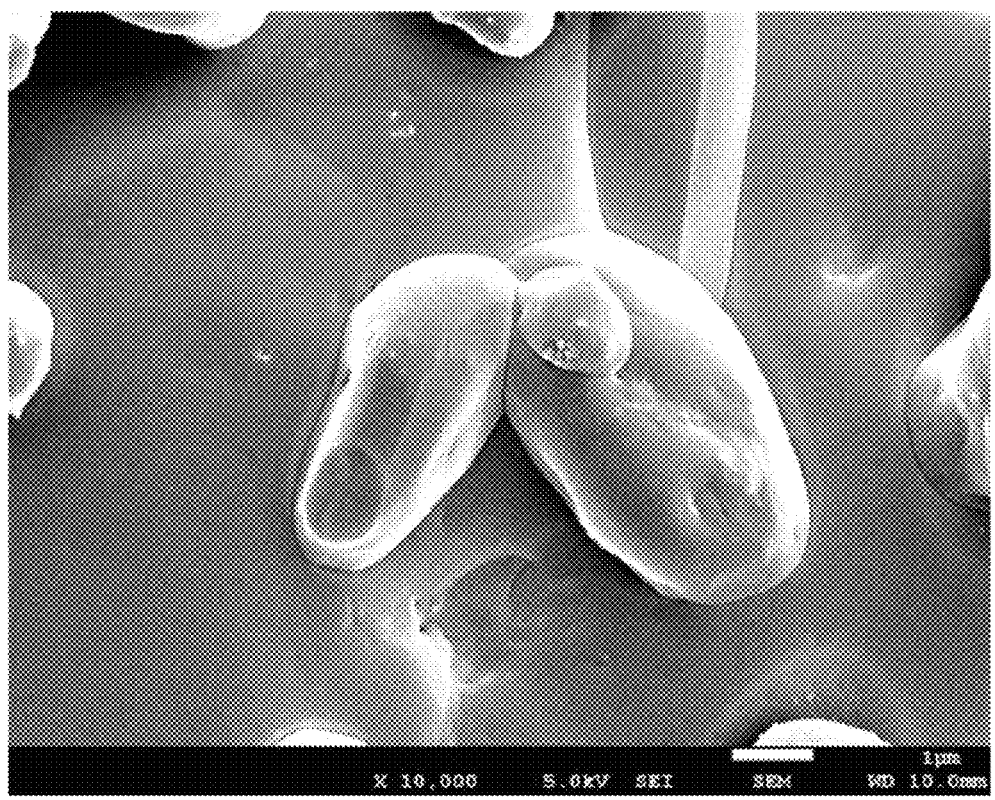
FIG. 9(B) is a SEM image (magnification: 10,000-fold) of the exemplary particle shape with magnification changed.

Ammonium pentaborate octahydrate (($NH_4$)$_2$O.5$B_2O_3$.8$H_2$O) powder was used as the third compound (the B compound). For the ammonium pentaborate octahydrate (($NH_4$)$_2$O.5$B_2O_3$.8$H_2$O) powder, a guaranteed reagent manufactured by Wako Pure Chemical Industries, Ltd. was crushed with a mortar and was then sieved with a 53-μm mesh, and the obtained minus sieve was used. The obtained ammonium pentaborate octahydrate powder was observed with a scanning electron microscope (SEM) and was determined to be particles with an indefinite shape with a primary particle diameter of up to 100 μm as shown in FIG. 9.

A positive electrode active material for a nonaqueous electrolyte secondary battery according to Example 5 was obtained similarly to Example 1 except that 30.08 g of the fired powder and 0.09 g of the ammonium pentaborate octahydrate powder were mixed together. The obtained positive electrode active material was analyzed by ICP emission spectrometry and was determined to contain boron (B) as an ammonium pentaborate octahydrate component in an amount of 0.06% by mass.

Figure 19:
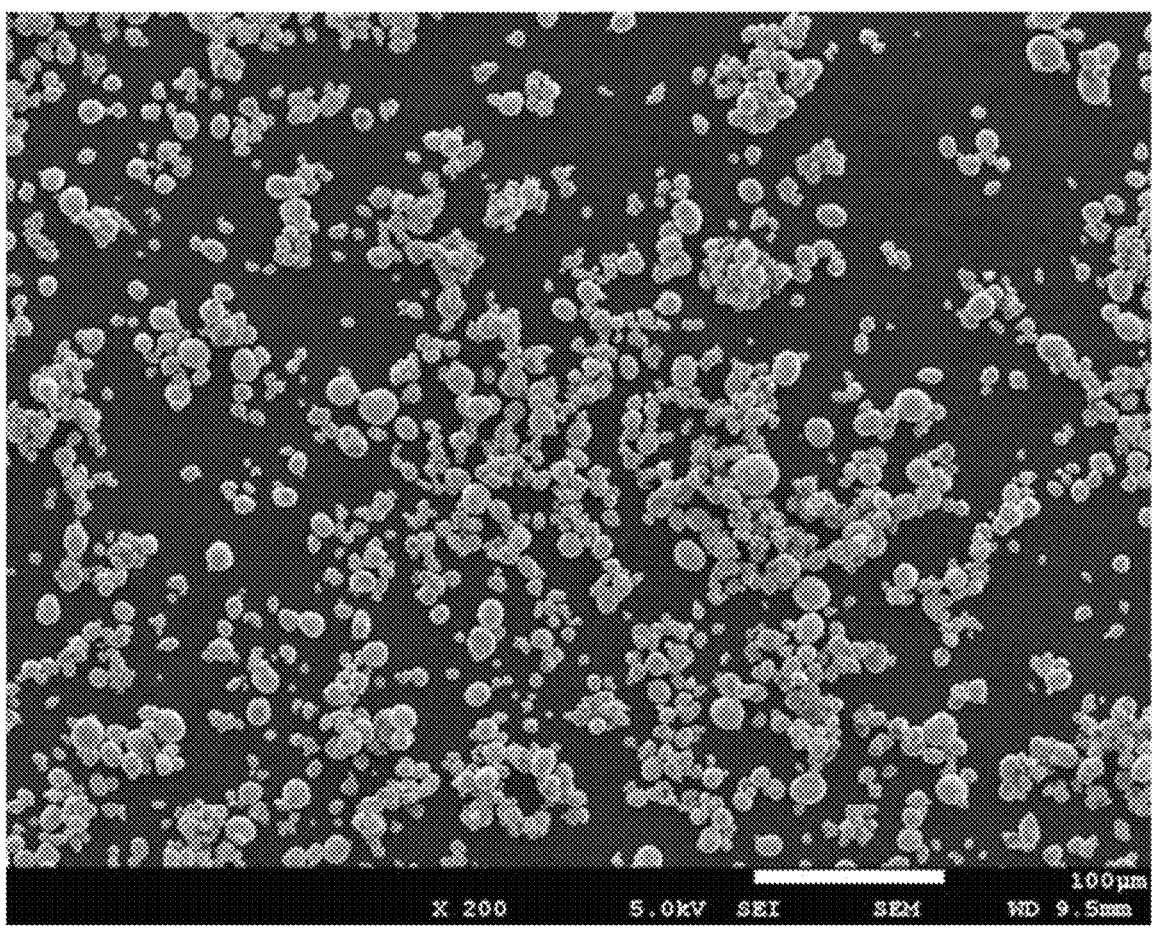
FIG. 19 is a SEM image (magnification: 200-fold) of a particle shape of a positive electrode active material according to Example 5.

When the positive electrode active material for a nonaqueous electrolyte secondary battery was observed with a scanning electron microscope (SEM), particles with an indefinite shape corresponding to the ammonium pentaborate octahydrate powder were not recognized as shown in FIG. 19; it was considered that the ammonium pentaborate octahydrate powder reacted with the excessive lithium and the lithium eluted from the crystal part of the fired powder to form the LB compound. Table 1 and Table 2 list evaluation results using the obtained positive electrode active material. FIG. 26 illustrates a temporal change in the viscosity of a positive electrode mixture paste produced using the obtained positive electrode active material.

Example 6

Figure 10A:
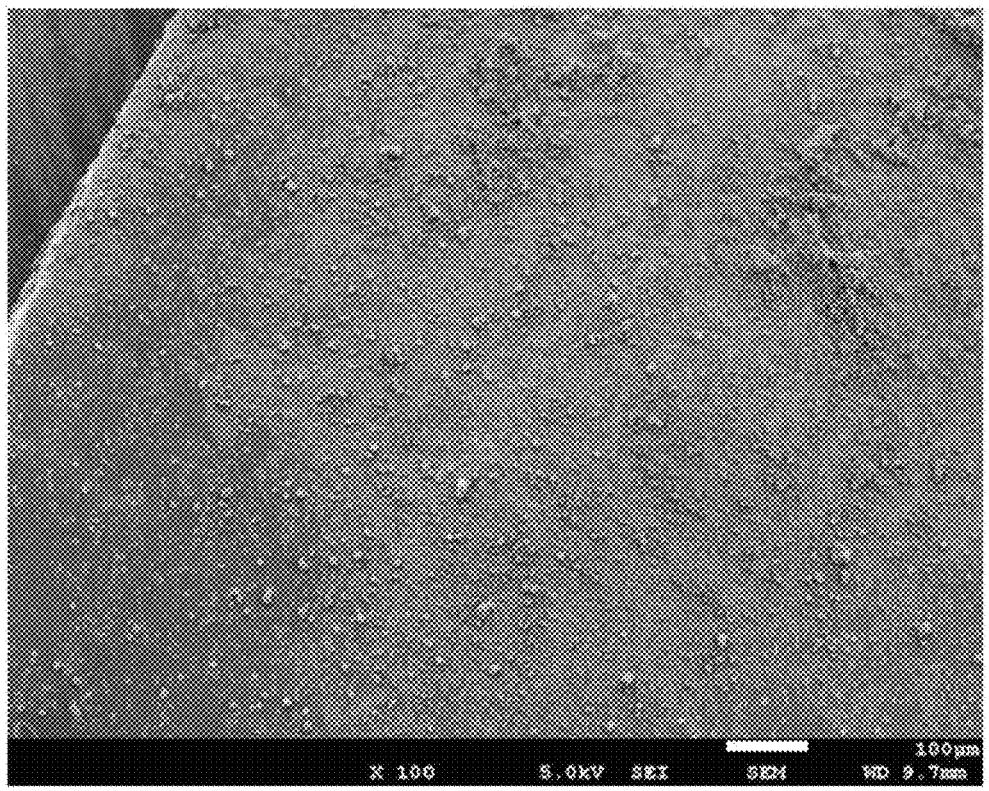
FIG. 10(A) is a SEM image (magnification: 100-fold) of an exemplary particle shape of a fourth compound (tungstic acid powder) used in Example 6.
Figure 10B:
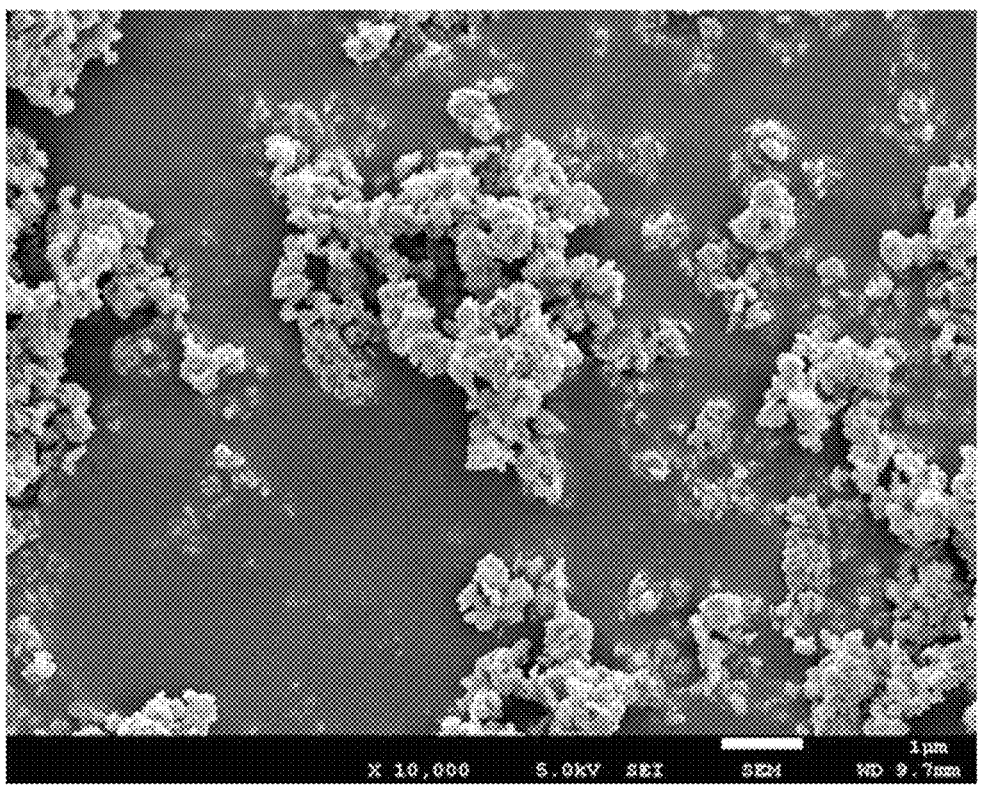
FIG. 10(B) is a SEM image (magnification: 10,000-fold) of the exemplary particle shape with magnification changed.

Tungstic acid ($H_2WO_4$) powder was used as the fourth compound (the W compound). For the tungstic acid ($H_2WO_4$) powder, a guaranteed reagent manufactured by Wako Pure Chemical Industries, Ltd. was crushed with a mortar and was then sieved with a 53-μm mesh, and the obtained minus sieve was used. The obtained tungstic acid powder was observed with a scanning electron microscope (SEM) and was determined to be secondary particles formed of flocculated primary particles with about 0.1 μm, and the secondary particle diameter was up to 10 μm as shown in FIG. 10.

A positive electrode active material was obtained similarly to Example 1 except that 30.02 g of the fired powder and 0.12 g of the tungstic acid powder were mixed together. The obtained positive electrode active material was analyzed by ICP emission spectrometry and was determined to contain tungsten (W) as a tungstic acid component in an amount of 0.28% by mass.

Figure 20:
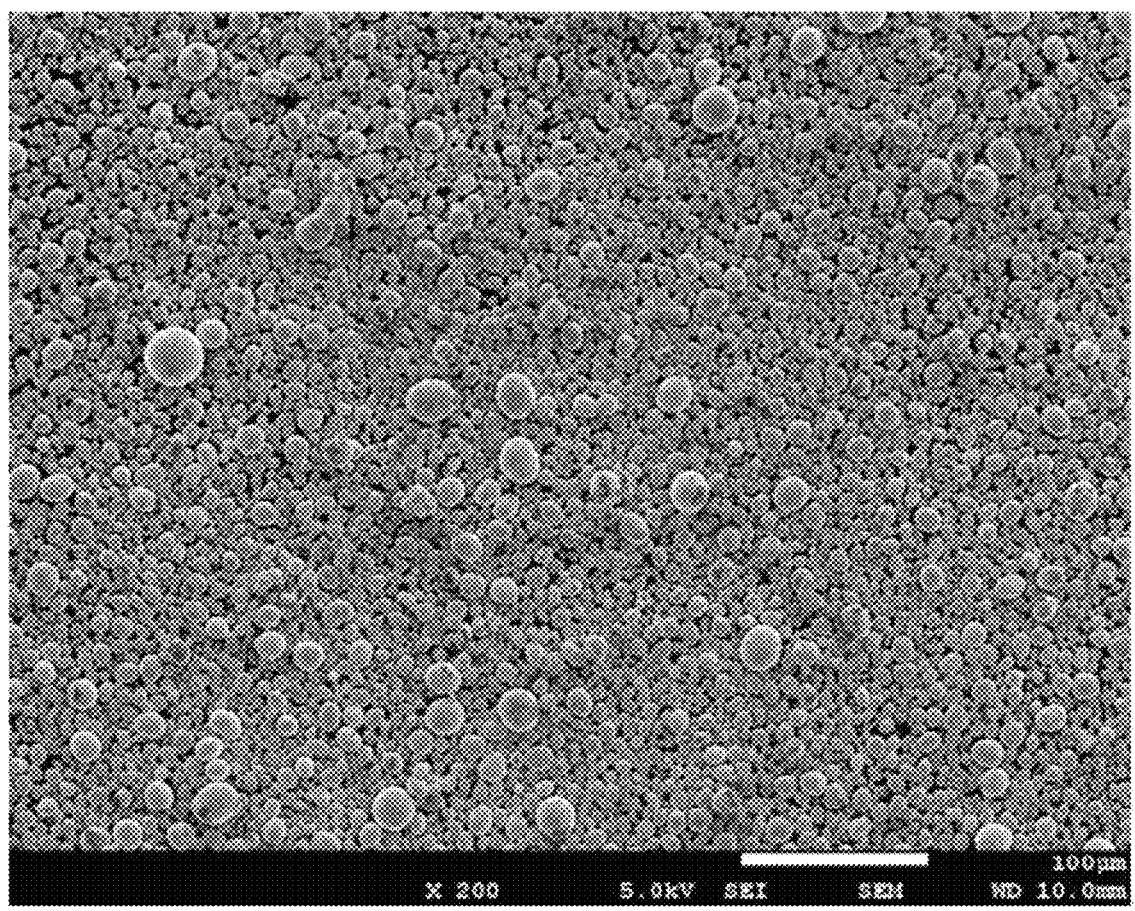
FIG. 20 is a SEM image (magnification: 200-fold) of a particle shape of a positive electrode active material according to Example 6.

When the positive electrode active material for a nonaqueous electrolyte secondary battery was observed with a scanning electron microscope (SEM), secondary particles corresponding to the tungstic acid powder were not recognized as shown in FIG. 20; it was considered that the tungstic acid powder reacted with the excessive lithium and the lithium eluted from the crystal part of the fired powder to form the LW compound. Table 1 and Table 2 list evaluation results using the obtained positive electrode active material. FIG. 26 illustrates a temporal change in the viscosity of a positive electrode mixture paste produced using the obtained positive electrode active material.

Example 7

Figure 11A:
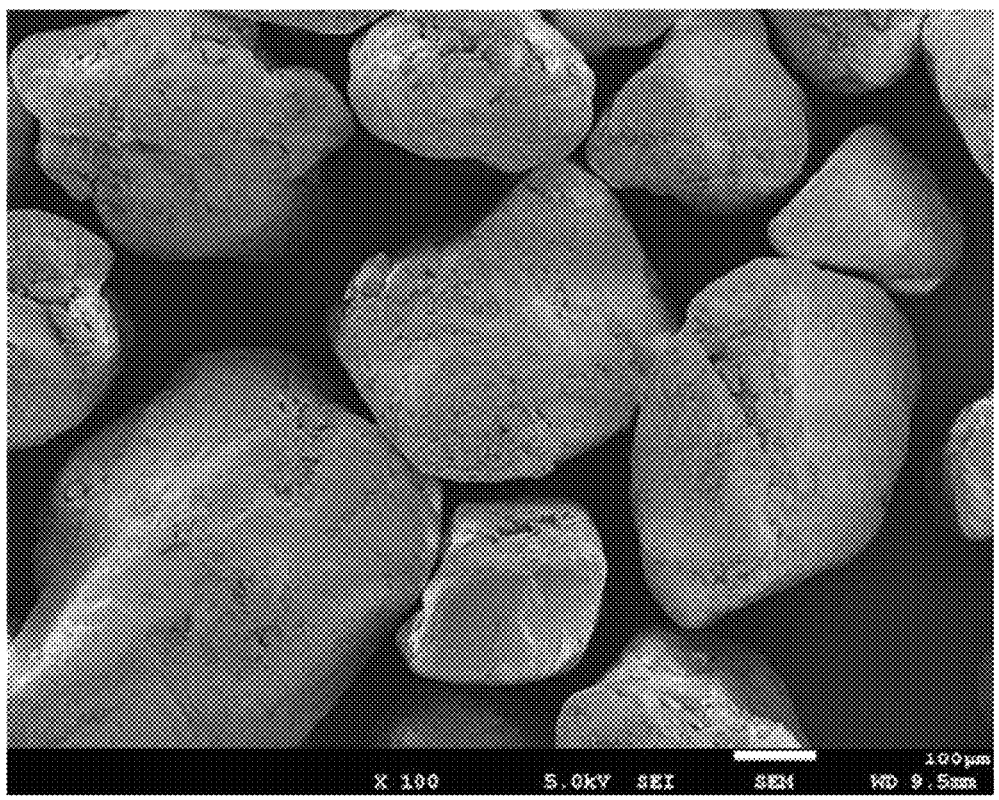
FIG. 11(A) is a SEM image (magnification: 100-fold) of an exemplary particle shape of the third compound (boric acid powder) used in Example 7.
Figure 11B:
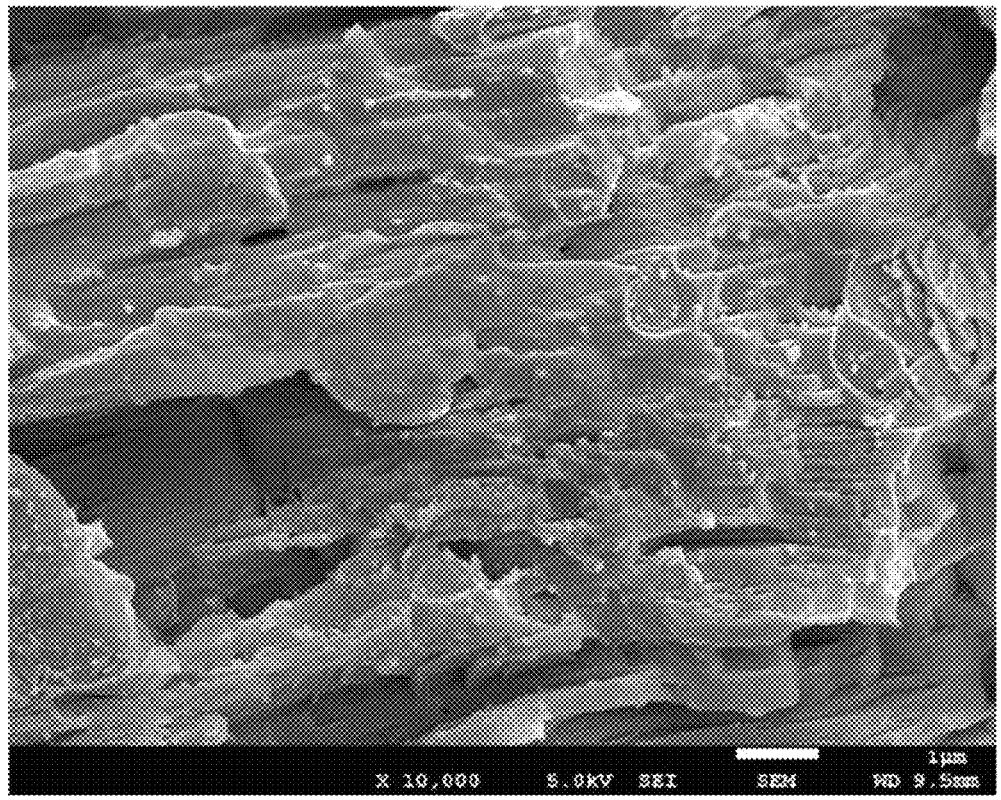
FIG. 11(B) is a SEM image (magnification: 10,000-fold) of the exemplary particle shape with magnification changed.

Boric acid ($H_3BO_3$) powder (a guaranteed reagent manufactured by Hayashi Pure Chemical Ind., Ltd.) was used as the third compound (the B compound) without mortar crushing. The boric acid powder was observed with a scanning electron microscope (SEM) and was determined to be particles with an indefinite shape having a layered structure as shown in FIG. 11. The particle diameter was measured with a vacuum dispersion image analysis particle size distribution analyzer and was determined to have a volume average particle diameter of 328 μm.

Put into a mixing vessel were 30.00 g of the fired powder and 0.38 g of the boric acid powder, which were mixed together for 10 minutes using a planetary centrifugal mixer to obtain a positive electrode active material. The obtained positive electrode active material was analyzed by ICP emission spectrometry and was determined to contain boron (B) as a boric acid component in an amount of 0.22% by mass.

Figure 21:
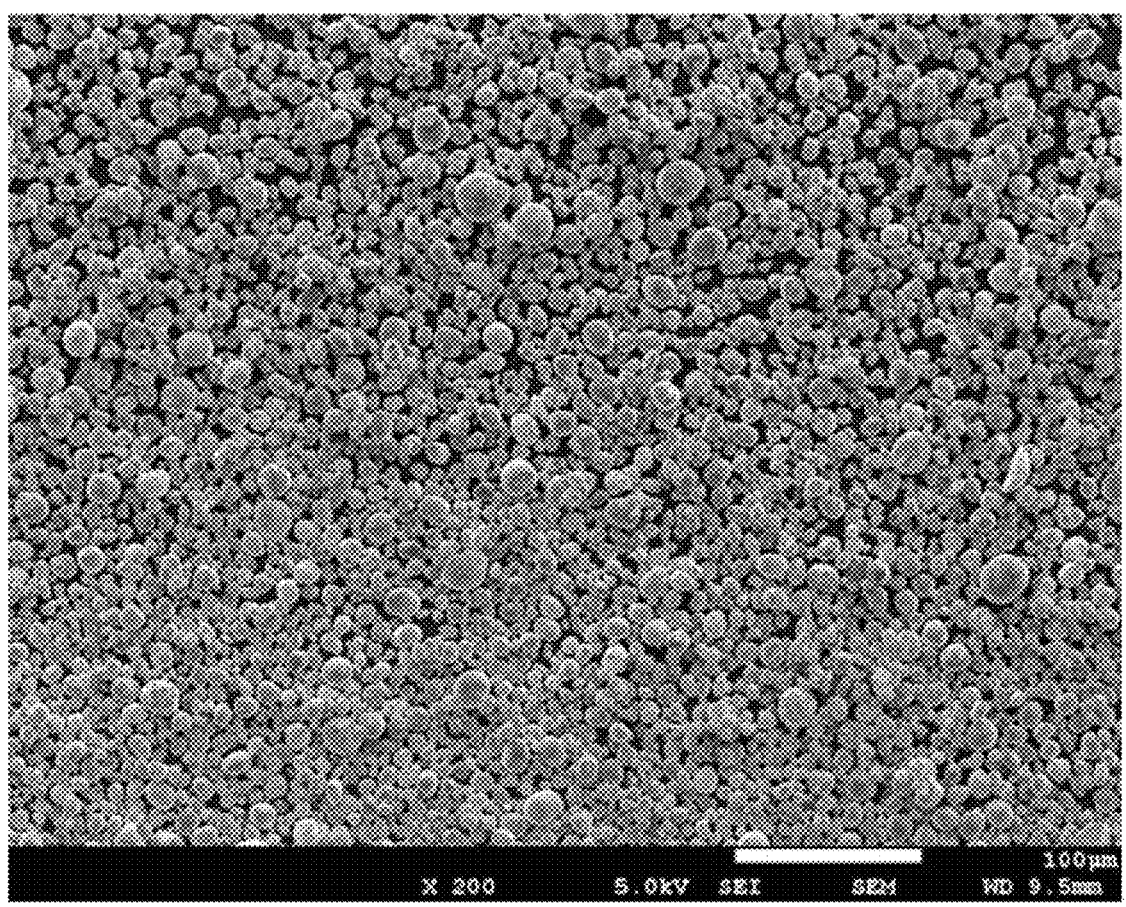
FIG. 21 is a SEM image (magnification: 200-fold) of a particle shape of a positive electrode active material according to Example 7.

When the obtained positive electrode active material was observed with a scanning electron microscope (SEM), particles with an indefinite shape having a layered structure corresponding to the boric acid powder were not recognized as shown in FIG. 21; it was considered that the boric acid powder reacted with the excessive lithium and the lithium eluted from the crystal part of the fired powder to form the LB compound. When the obtained positive electrode active material was analyzed with an X-ray diffraction apparatus (XRD), a diffraction peak of boric acid ($H_3BO_3$) was not detected, and a diffraction peak of lithium metaborate ($LiBO_2 \cdot 2H_2O$) was detected, by which it was determined that the LB compound was formed.

Table 1 and Table 2 list evaluation results using the obtained positive electrode active material.

Comparative Example 1

A positive electrode active material according to Comparative Example 1 was produced similarly to Example 1 except that the third compound (the B compound) and the fourth compound (the W compound) were not added, and the mixing with the planetary centrifugal mixer was not performed.

Figure 22:
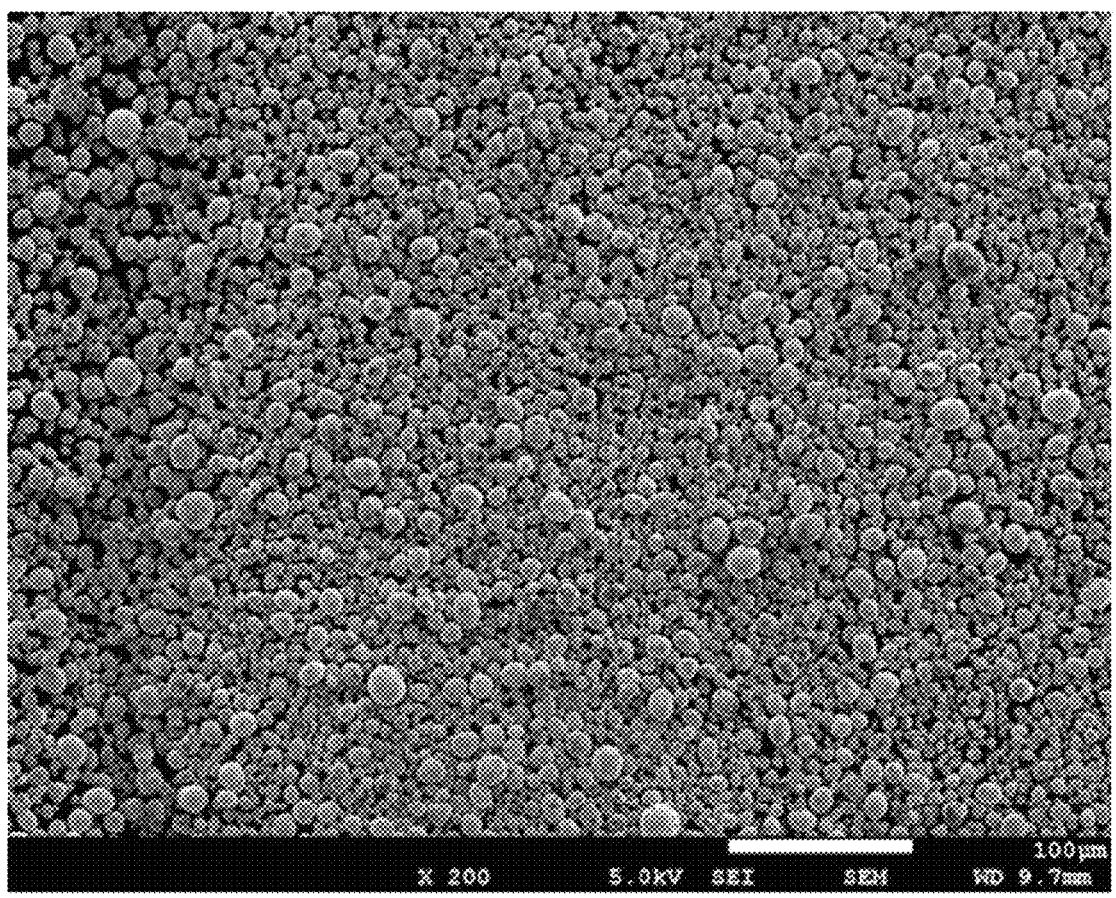
FIG. 22 is a SEM image (magnification: 200-fold) of a particle shape of a positive electrode active material according to Comparative Example 1.

When the positive electrode active material for a nonaqueous electrolyte secondary battery was observed with a scanning electron microscope (SEM), it was determined that the lithium-metal composite oxide before performing mixing processing was spherical particles with up to 20 μm as shown in FIG. 22. Table 1 and Table 2 list evaluation results using the obtained positive electrode active material. FIG. 26 illustrates a temporal change in the viscosity of a positive electrode mixture paste produced using the obtained positive electrode active material.

Comparative Example 2

Figure 12A:
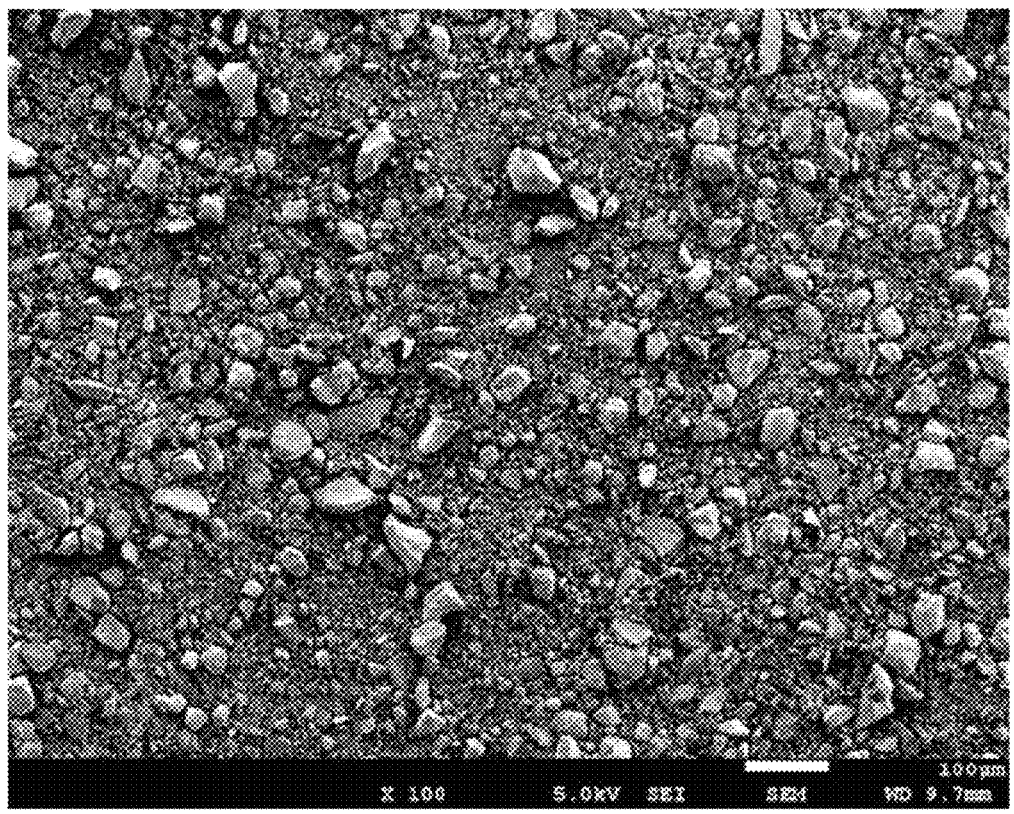
FIG. 12(A) is a SEM image (magnification: 100-fold) of an exemplary particle shape of the third compound (lithium metaborate dihydrate powder) used in Comparative Example 2.
Figure 12B:
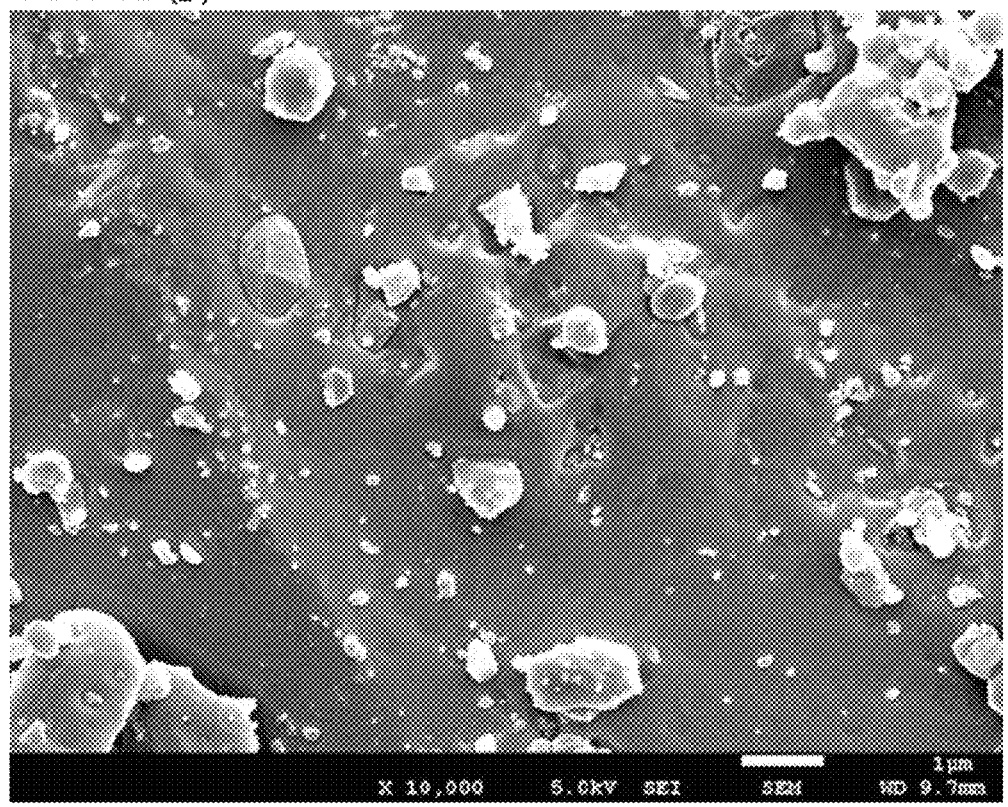
FIG. 12(B) is a SEM image (magnification: 10,000-fold) of the exemplary particle shape with magnification changed.

Lithium metaborate dihydrate ($LiBO_2 \cdot 2H_2O$) powder was used as the third compound (the B compound). For the lithium metaborate dihydrate ($LiBO_2 \cdot 2H_2O$) powder, a reagent manufactured by Mitsuwa Chemicals Co., Ltd. was crushed with a mortar and was then sieved with a 53-μm mesh, and the obtained minus sieve was used. The obtained lithium metaborate dihydrate powder was observed with a scanning electron microscope (SEM) and was determined to be particles with an indefinite shape with a primary particle diameter of up to 100 μm as shown in FIG. 12.

A positive electrode active material was obtained similarly to Example 1 except that 30.00 g of the fired powder and 0.13 g of the lithium metaborate dihydrate powder were mixed together. The obtained positive electrode active material was analyzed by ICP emission spectrometry and was determined to contain boron (B) as a lithium metaborate dihydrate component in an amount of 0.05% by mass.

Figure 23:
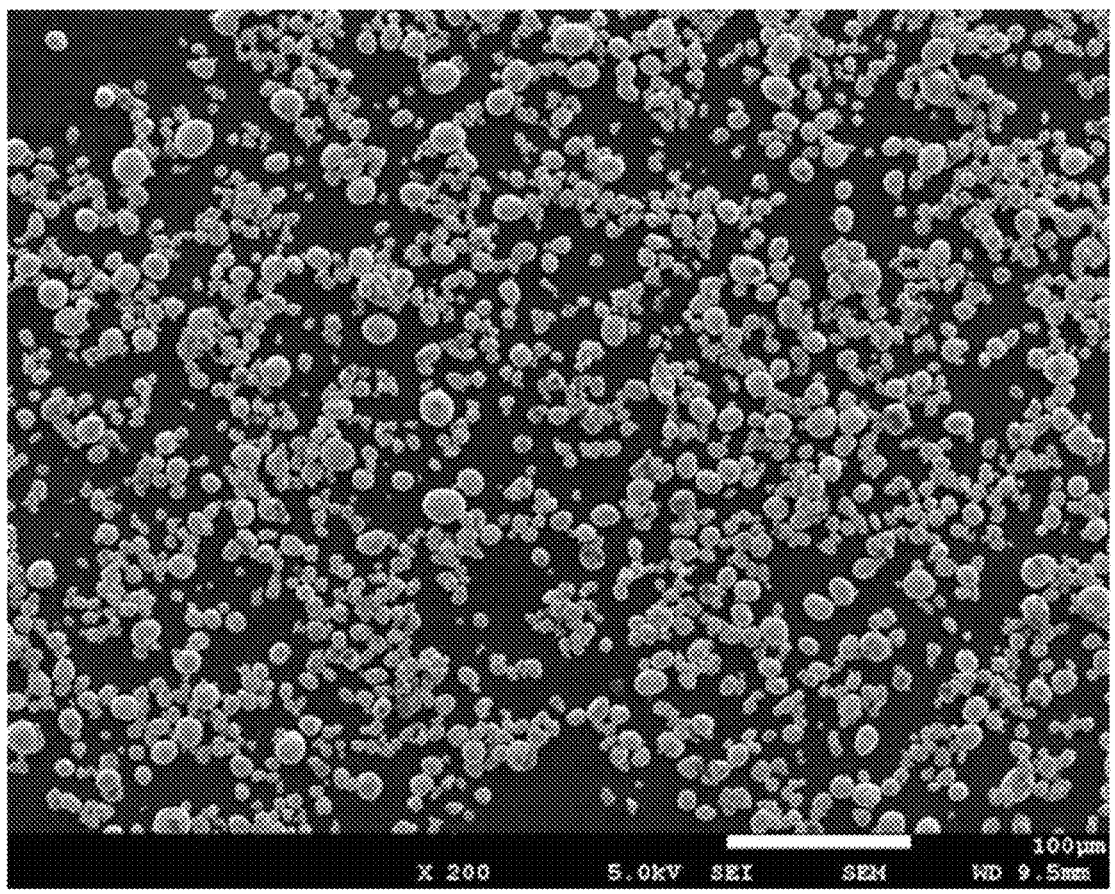
FIG. 23 is a SEM image (magnification: 200-fold) of a particle shape of a positive electrode active material according to Comparative Example 2.

When the positive electrode active material was observed with a scanning electron microscope (SEM), particles with an indefinite shape corresponding to the lithium metaborate dihydrate powder were not recognized as shown in FIG. 23. Table 1 and Table 2 list evaluation results using the obtained positive electrode active material. FIG. 26 illustrates a temporal change in the viscosity of a positive electrode mixture paste produced using the obtained positive electrode active material.

Comparative Example 3

Figure 13A:
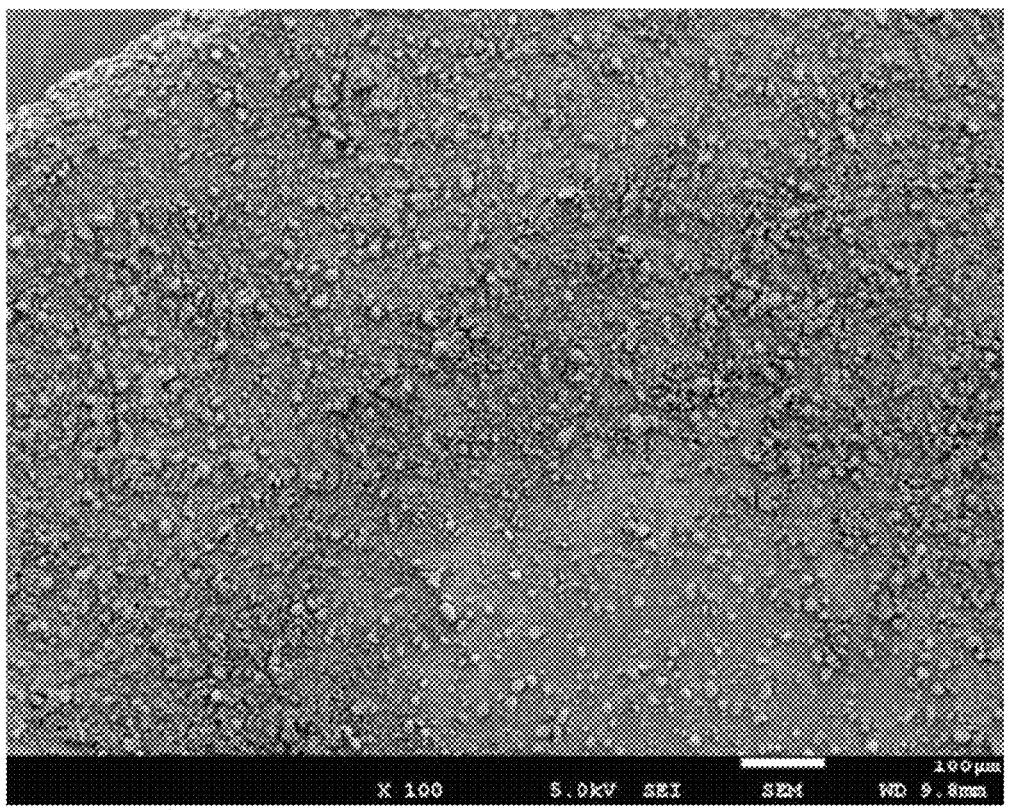
FIG. 13(A) is a SEM image (magnification: 100-fold) of an exemplary particle shape of the fourth compound (tungsten oxide powder) used in Comparative Example 3.
Figure 13B:
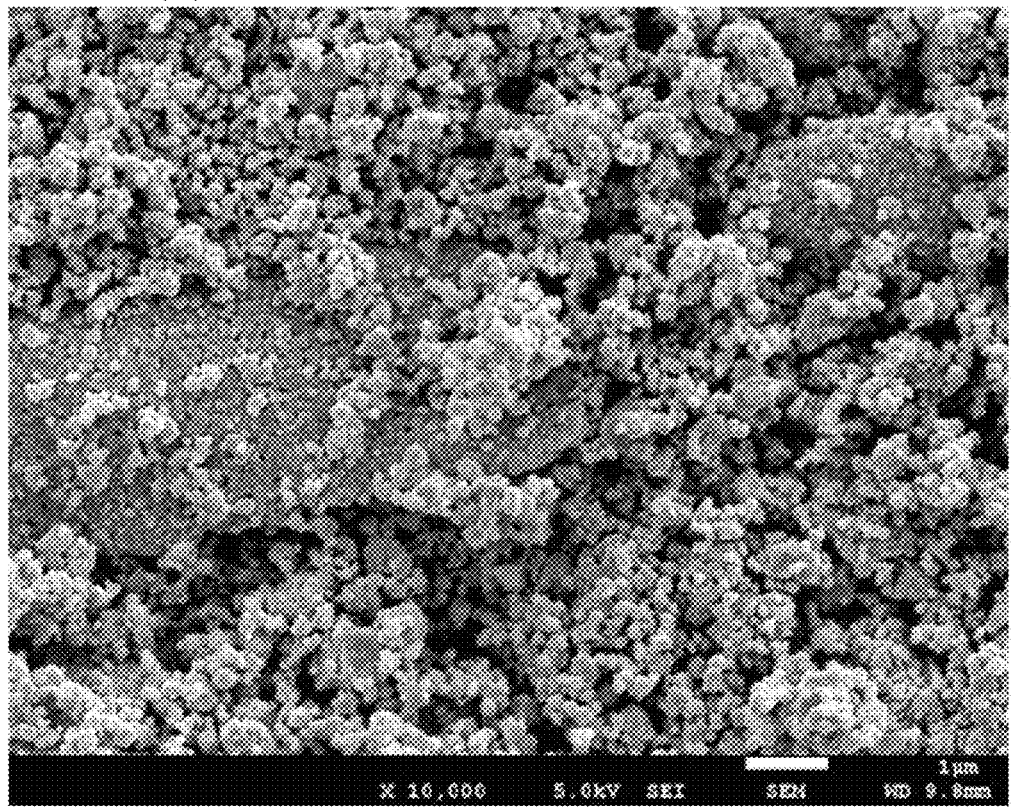
FIG. 13(B) is a SEM image (magnification: 10,000-fold) of the exemplary particle shape with magnification changed.

Tungsten oxide ($WO_3$) powder was used as the fourth compound (the W compound). For the tungsten oxide ($WO_3$) powder, an extra pure reagent manufactured by Kanto Chemical Co., Inc. was crushed with a mortar and was then sieved with a 53-μm mesh, and the obtained minus sieve was used. The obtained tungsten oxide powder was observed with a scanning electron microscope (SEM) and was determined to be secondary particles with an indefinite shape formed of flocculated primary particles with about 0.1 μm, and the secondary particle diameter was up to 10 μm as shown in FIG. 13.

A positive electrode active material was obtained similarly to Example 1 except that 30.01 g of the fired powder and 0.12 g of the tungsten oxide powder were mixed together. The obtained positive electrode active material was analyzed by ICP emission spectrometry and was determined to contain tungsten (W) as a tungsten oxide component in an amount of 0.22% by mass.

Figure 24:
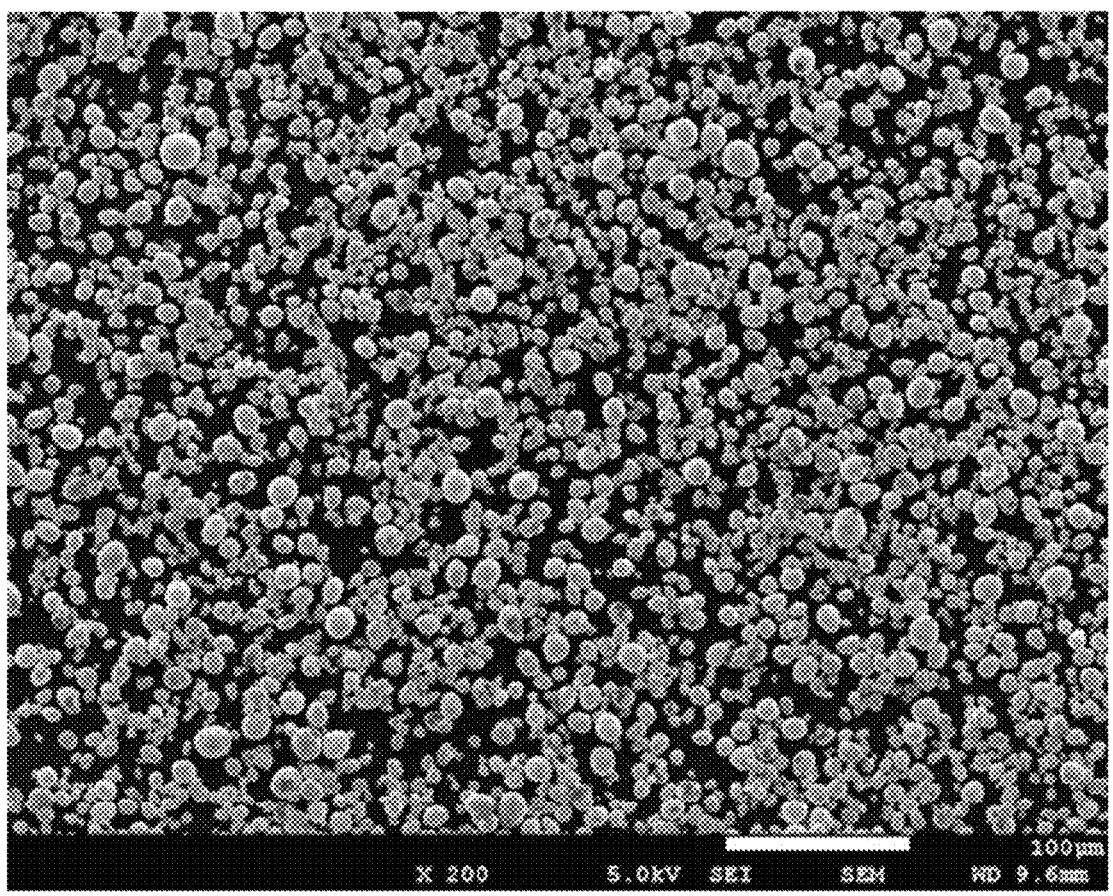
FIG. 24 is a SEM image (magnification: 200-fold) of a particle shape of a positive electrode active material according to Comparative Example 3.

When the positive electrode active material was observed with a scanning electron microscope (SEM), secondary particles with an indefinite shape corresponding to the tungstic acid powder were not recognized as shown in FIG. 24. Table 1 and Table 2 list evaluation results using the obtained positive electrode active material. FIG. 26 illustrates a temporal change in the viscosity of a positive electrode mixture paste produced using the obtained positive electrode active material.

Comparative Example 4

Figure 14A:
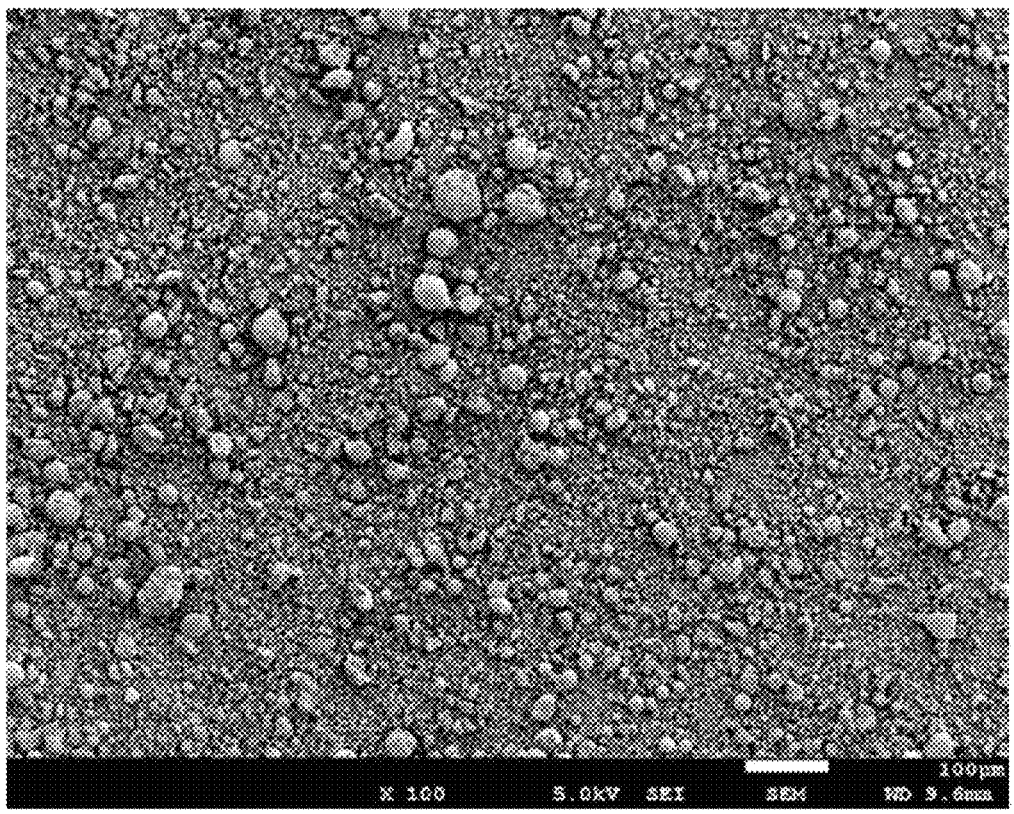
FIG. 14(A) is a SEM image (magnification: 100-fold) of an exemplary particle shape of the fourth compound (lithium tungstate powder) used in Comparative Example 4.
Figure 14B:
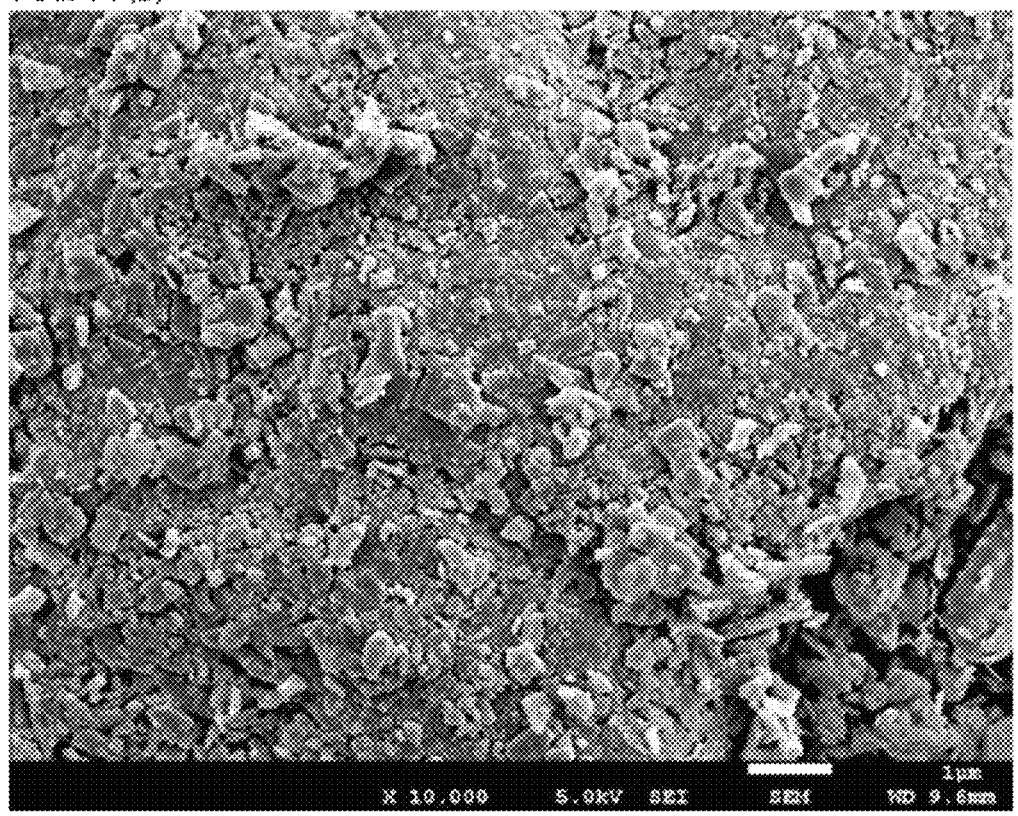
FIG. 14(B) is a SEM image (magnification: 10,000-fold) of the exemplary particle shape with magnification changed.

Lithium tungstate ($Li_2WO_4$) powder was used as the fourth compound (the W compound). For the lithium tungstate ($Li_2WO_4$) powder, a reagent manufactured by Kojundo Chemical Laboratory Co., Ltd. was crushed with a mortar and was then sieved with a 53-μm mesh, and the obtained minus sieve was used. The obtained lithium tungstate powder was observed with a scanning electron microscope (SEM) and was determined to be particles with an indefinite shape with a particle diameter of up to 50 μm as shown in FIG. 14.

A positive electrode active material for a nonaqueous electrolyte secondary battery according to Example 3 was obtained and evaluated similarly to Example 1 except that 30.01 g of the fired powder and 0.19 g of the lithium tungstate powder were mixed together. The positive electrode active material was analyzed by ICP emission spectrometry and was determined to contain tungsten (W) as a lithium tungstate component in an amount of 0.42% by mass.

Figure 25:
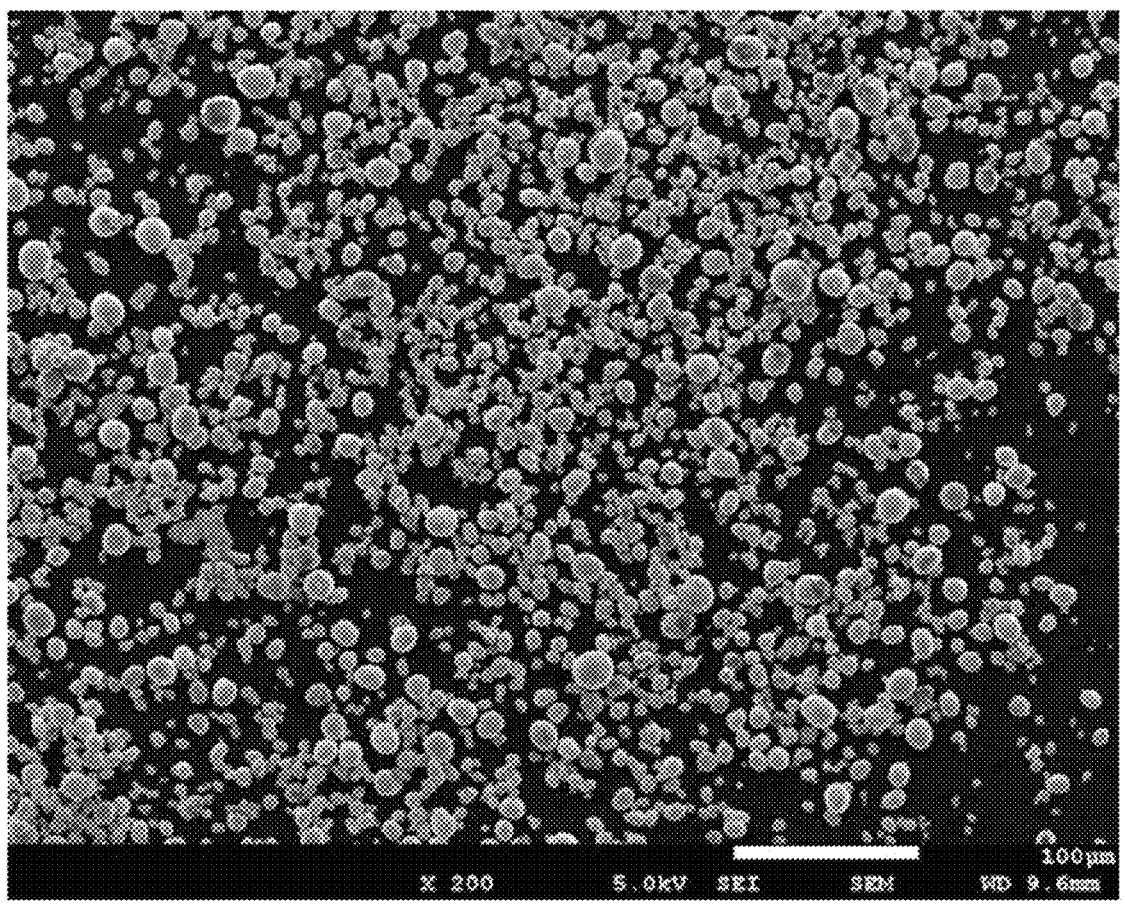
FIG. 25 is a SEM image (magnification: 200-fold) of a particle shape of a positive electrode active material according to Comparative Example 4.

When the obtained positive electrode active material was observed with a scanning electron microscope (SEM), secondary particles with an indefinite shape corresponding to the tungstic acid powder were not recognized as shown in FIG. 25. Table 1 and Table 2 list evaluation results using the obtained positive electrode active material. FIG. 26 illustrates a temporal change in the viscosity of a positive electrode mixture paste produced using the obtained positive electrode active material.

the LW compound. It was also determined that the positive electrode mixture pastes of the examples did not gelate to hold their paste form even after being stored for two or more days at room temperature.

On the other hand, it was determined that the positive electrode mixture paste of Comparative Example 1 lost

TABLE 1

| | Fired powder | | Mixed | Positive electrode active material | | |
|---|---|---|---|---|---|---|
| | Composition | Eluted Li amount % by mass | compound Type B/W compound | B content % by mass | W content % by mass | Amount of eluted Li % by mass |
| Example 1 | $Li_{1.023}Ni_{0.88}Co_{0.09}Al_{0.03}O_2$ | 0.40 | Boric acid | 0.07 | 0 | 0.39 |
| Example 2 | $Li_{1.023}Ni_{0.88}Co_{0.09}Al_{0.03}O_2$ | 0.40 | Boric acid | 0.11 | 0 | 0.35 |
| Example 3 | $Li_{1.023}Ni_{0.88}Co_{0.09}Al_{0.03}O_2$ | 0.40 | Boric acid | 0.33 | 0 | 0.35 |
| Example 4 | $Li_{1.023}Ni_{0.88}Co_{0.09}Al_{0.03}O_2$ | 0.40 | Boron oxide | 0.04 | 0 | 0.39 |
| Example 5 | $Li_{1.023}Ni_{0.88}Co_{0.09}Al_{0.03}O_2$ | 0.40 | Ammonium pentaborate octahydrate | 0.06 | 0 | 0.39 |
| Example 6 | $Li_{1.023}Ni_{0.88}Co_{0.09}Al_{0.03}O_2$ | 0.40 | Tungstic acid | 0 | 0.28 | 0.38 |
| Example 7 | $Li_{1.023}Ni_{0.88}Co_{0.09}Al_{0.03}O_2$ | 0.40 | Boric acid (uncrushed) | 0.22 | — | 0.34 |
| Comparative Example 1 | $Li_{1.023}Ni_{0.88}Co_{0.09}Al_{0.03}O_2$ | 0.40 | None | — | — | 0.40 |
| Comparative Example 2 | $Li_{1.023}Ni_{0.88}Co_{0.09}Al_{0.03}O_2$ | 0.40 | Lithium metaborate dihydrate | 0.05 | 0 | 0.42 |
| Comparative Example 3 | $Li_{1.023}Ni_{0.88}Co_{0.09}Al_{0.03}O_2$ | 0.40 | Tungsten oxide | 0 | 0.22 | 0.40 |
| Comparative Example 4 | $Li_{1.023}Ni_{0.88}Co_{0.09}Al_{0.03}O_2$ | 0.40 | Lithium tungstate | 0 | 0.42 | 0.41 |

TABLE 2

| | Positive electrode mixture paste Stability | Battery characteristics | | |
|---|---|---|---|---|
| | | Initial charging capacity mAh/g | Initial discharging capacity mAh/g | Positive electrode resistance Ω |
| Example 1 | A (7 or more days) | 225 | 201 | 2.4 |
| Example 2 | A (7 or more days) | 225 | 201 | 2.4 |
| Example 3 | A (7 or more days) | 220 | 193 | 2.9 |
| Example 4 | A (7 or more days) | 226 | 202 | 2.2 |
| Example 5 | A (7 or more days) | 224 | 200 | 2.6 |
| Example 6 | B (2 days) | 223 | 198 | 2.6 |
| Example 7 | A (7 or more days) | 223 | 198 | 2.6 |
| Comparative Example 1 | C (less than 1 day) | 225 | 201 | 2.5 |
| Comparative Example 2 | C (less than 1 day) | 225 | 201 | 2.6 |
| Comparative Example 3 | C (less than 1 day) | 223 | 200 | 2.7 |
| Comparative Example 4 | C (less than 1 day) | 224 | 200 | 2.6 |

(Evaluation Results)

It was determined that the secondary batteries containing the positive electrode active materials of the examples (the composition of the lithium-metal composite oxide: $Li_{1.023}Ni_{0.88}Co_{0.09}Al_{0.03}O_2$) obtained the initial charging capacity (at least 223 mAh/g and up to 226 mAh/g), the initial discharging capacity (at least 200 mAh/g and up to 202 mAh/g), and the positive electrode resistance (at least 2.2Ω and up to 2.7Ω) comparable to those of Comparative Example 1, which does not contain the LB compound and flowability to gelate when it was stored for one day at room temperature. It was also determined that the positive electrode mixture pastes for which the mixing processing was performed of Comparative Examples 2 to 4 lost flowability to gelate when they were stored for one day at room temperature.

The technical scope of the present invention is not limited to the aspects described in the embodiments and the like. One or more of the requirements described in the embodiments and the like may be omitted. The requirements described in the embodiments and the like can be combined as appropriate. Japanese Patent Application No. 2016-166496 and all the literature cited in this specification are herein incorporated by reference in their entirety to the extent allowed by law.

DESCRIPTION OF REFERENCE SIGNS

1, 1a, 1b Primary particle
2 Secondary particle
3 First compound (LB compound)
4 Second compound (LW compound)
10 First lithium-metal composite oxide
20 Positive electrode active material
CBA Coin-type battery
PE Positive electrode (electrode for evaluation)
NE Negative electrode
SE Separator
GA Gasket
WW Wave washer
PE Positive electrode can
PC Negative electrode can

The invention claimed is:

1. A positive electrode active material for a nonaqueous electrolyte secondary battery, the positive electrode active material comprising:
   a first lithium-metal composite oxide represented by General Formula (1): $Li_{s1}Ni_{1-x1-y1-z1}Co_{x1}Mn_{y1}M_{z1}O_{2+\alpha}$ (where $0 \leq x1 \leq 0.35$, $0 \leq y1 \leq 0.35$, $0 \leq z1 \leq 0.10$, $0.95 < s1 < 1.30$, and $0 \leq \alpha \leq 0.2$; and M is at least one element selected from V, Mg, Mo, Nb, Ti, W, and Al) and containing a secondary particle formed of a plurality of flocculated primary particles; and
   either one or both of a first compound containing lithium and boron and a second compound containing lithium and tungsten, wherein
   either one or both of the following characteristics (1) and (2) are satisfied, and
   a lithium amount eluted when the positive electrode active material is dispersed in water measured by neutralization titration is at least 0.01% by mass and less than 0.4% by mass relative to the entire positive electrode active material:
   (1) the first compound covers surfaces of the primary particles, and a boron content is at least 0.01% by mass and up to 0.5% by mass relative to the entire positive electrode active material; and
   (2) the second compound covers the surfaces of the primary particles, and a tungsten content is at least 0.01% by mass and up to 1.0% by mass relative to the entire positive electrode active material.

2. The positive electrode active material for a nonaqueous electrolyte secondary battery according to claim 1, wherein the positive electrode active material has an average particle diameter of at least 5 μm and up to 30 μm and [(d90−d10)/Average particle diameter] as an indicator indicating a spread of particle size distribution of at least 0.70.

3. A method for producing a positive electrode active material for a nonaqueous electrolyte secondary battery, the method comprising mixing fired powder and either one or both of a compound containing boron and a compound containing tungsten together to obtain a positive electrode active material, wherein
   the fired powder is a lithium-metal composite oxide represented by General Formula (2): $Li_{s2}Ni_{1-x2-y2-z2}Co_{x2}Mn_{y2}M_{z2}O_{2+\alpha'}$ (where $0 \leq x2 \leq 0.35$, $0 \leq y2 \leq 0.35$, $0 \leq z2 \leq 0.10$, $0.95 < s2 < 1.30$, and $0 \leq \alpha' \leq 0.2$; and M is at least one element selected from V, Mg, Mo, Nb, Ti, W, and Al) and contains a secondary particle formed of a plurality of flocculated primary particles,
   a lithium amount eluted when the fired powder is dispersed in water measured by neutralization titration is at least 0.05% by mass and up to 1.0% by mass relative to the entire fired powder, and
   the compound containing boron and the compound containing tungsten are solid compounds that do not contain lithium and are capable of reacting with lithium and are mixed such that either one or both of the following conditions (i) and (ii) are satisfied:
   (i) a boron content is at least 0.01% by mass and up to 0.5% by mass relative to the entire positive electrode active material; and
   (ii) a tungsten content is at least 0.01% by mass and up to 1.0% by mass relative to the entire positive electrode active material.

4. The method for producing a positive electrode active material for a nonaqueous electrolyte secondary battery according to claim 3, wherein an amount of either one or both of the compound containing boron and the compound containing tungsten to be mixed is adjusted such that an amount of lithium eluted when the positive electrode active material is dispersed in water measured by neutralization titration is at least 0.01% by mass and less than 0.4% by mass relative to the entire positive electrode active material.

5. The method for producing a positive electrode active material for a nonaqueous electrolyte secondary battery according to claim 3, wherein the compound containing boron contains one or more selected from boric acid ($H_3BO_3$), boron oxide ($B_2O_3$), ammonium tetraborate tetrahydrate (($NH_4$)$_2B_4O_7 \cdot 4H_2O$), and ammonium pentaborate octahydrate (($NH_4$)$_2O \cdot 5B_2O_3 \cdot 8H_2O$).

6. The method for producing a positive electrode active material for a nonaqueous electrolyte secondary battery according to claim 3, wherein the compound containing tungsten contains tungstic acid ($H_2WO_4$).

7. A positive electrode mixture paste for a nonaqueous electrolyte secondary battery, the positive electrode mixture paste comprising the positive electrode active material for a nonaqueous electrolyte secondary battery according to claim 1.

8. A nonaqueous electrolyte secondary battery comprising a positive electrode containing the positive electrode active material for a nonaqueous electrolyte secondary battery according to claim 1, a negative electrode, and a nonaqueous electrolyte solution.

* * * * *